United States Patent
Sahai et al.

(10) Patent No.: US 11,470,440 B2
(45) Date of Patent: Oct. 11, 2022

(54) PROVISION AND USE OF GAPS FOR REFERENCE SIGNAL TIME DIFFERENCE MEASUREMENTS

(71) Applicant: QUALCOMM Incorporated, San Diego, CA (US)

(72) Inventors: Achaleshwar Sahai, San Jose, CA (US); Kapil Bhattad, Bangalore (IN); Sven Fischer, Nuremberg (DE); Alberto Rico Alvarino, San Diego, CA (US); Mungal Singh Dhanda, Slough (GB); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/054,257

(22) Filed: Aug. 3, 2018

(65) Prior Publication Data
US 2019/0052996 A1 Feb. 14, 2019

Related U.S. Application Data

(60) Provisional application No. 62/543,630, filed on Aug. 10, 2017.

(30) Foreign Application Priority Data

Aug. 10, 2017 (IN) .............................. 201741028437

(51) Int. Cl.
*H04W 4/02* (2018.01)
*H04W 64/00* (2009.01)
(Continued)

(52) U.S. Cl.
CPC ................. *H04W 4/02* (2013.01); *G01S 5/02* (2013.01); *G01S 5/10* (2013.01); *H04W 64/00* (2013.01); *H04W 76/28* (2018.02)

(58) Field of Classification Search
CPC ....... H04W 4/02; H04W 64/00; H04W 76/28; H04W 36/0088; H04W 24/10; G01S 5/10; G01S 5/02
See application file for complete search history.

(56) References Cited

U.S. PATENT DOCUMENTS

2012/0083221 A1* 4/2012 Ranta-Aho ........... H04W 24/10
455/67.11
2015/0018010 A1* 1/2015 Fischer ................. H04W 4/023
455/456.2
(Continued)

FOREIGN PATENT DOCUMENTS

CN 102595450 A 7/2012
CN 105309001 A 2/2016
(Continued)

OTHER PUBLICATIONS

International Search Report and Written Opinion—PCT/US2018/045736—ISA/EPO—dated Nov. 9, 2018.
(Continued)

*Primary Examiner* — Marcus Hammonds
(74) *Attorney, Agent, or Firm* — Qualcomm Incorporated

(57) ABSTRACT

Disclosed embodiments facilitate UE location determination in systems with dense PRS configurations, reduced PRS periodicity, frequency hopping, and involving UE inter-frequency measurements. The techniques may be applied to Bandwidth reduced-Low complexity (BL) UEs, or enhanced Machine Type Communication (eMTC) UEs or Further enhanced MTC (FeMTC) UEs and/or in LTE-M systems. A method on a UE may comprise: receiving a Reference Signal Time Difference (RSTD) measurement request; transmitting, in response to the RSTD measurement request, a dedicated gap request comprising a requested configuration of dedicated gaps; and receiving, in response to the dedicated gap request, a message comprising a dedicated gap configuration. The dedicated gap request may comprise a request for dedicated measurement gaps and the message may comprise a dedicated measurement gap configuration. In some embodiments, the dedicated gap request may comprise a request for dedicated autonomous gaps and the
(Continued)

message may comprise a dedicated autonomous gap configuration.

28 Claims, 15 Drawing Sheets

(51) Int. Cl.
*H04W 76/28* (2018.01)
*G01S 5/02* (2010.01)
*G01S 5/10* (2006.01)

(56) References Cited

U.S. PATENT DOCUMENTS

| | | | | |
|---|---|---|---|---|
| 2016/0119876 | A1* | 4/2016 | Gopal | H04W 52/0251 |
| | | | | 370/252 |
| 2016/0316447 | A1* | 10/2016 | Siomina | H04W 64/00 |
| 2017/0019810 | A1* | 1/2017 | Wu | H04W 72/0453 |
| 2018/0098253 | A1* | 4/2018 | Huang | H04W 24/10 |
| 2020/0196171 | A1* | 6/2020 | Thangarasa | H04W 24/08 |

FOREIGN PATENT DOCUMENTS

| | | |
|---|---|---|
| EP | 2648447 A1 | 10/2013 |
| WO | 2016039559 A1 | 3/2016 |

OTHER PUBLICATIONS

Ericsson: "Further Details on Measurement Gaps for Dense PRS", 3GPP TSG-RAN WG4 Meeting #86bis, R4-1804693, 3rd Generation Partnership Project, Mobile Competence Centre, 650, Route Des Lucioles, F-06921, Sophia-Antipolis Cedex, France, vol. RAN WG4, No. Melbourne, Australia, Apr. 16, 2018-Apr. 20, 2018, Apr. 6, 2018, XP051418306, 5 Pages.

Huawei, et al., "Discussion on RSTD Measurement for FeMTC", 3GPP TSG RAN WG4 #82Bis, R4-1703658, Spokane, US, Apr. 3-7, 2017, 3 Pages.

* cited by examiner

500

510

Receive, from a UE, a dedicated gap request for performing RSTD measurements, the dedicated gap request comprising a desired configuration of dedicated gaps

520

Respond, to the UE, indicating a dedicated gap configuration

700

710

Receive, from a UE, a dedicated gap request for performing RSTD measurements, the dedicated gap request comprising a desired configuration of dedicated autonomous gaps

720

Respond, to the UE, indicating a dedicated autonomous gap configuration

730

Refrain from transmitting to UE over data and control channels during configured dedicated autonomous gap periods;
OR
Reduce data rate for transmissions to UE during configured dedicated autonomous gap periods;

FIG. 7

PROVISION AND USE OF GAPS FOR REFERENCE SIGNAL TIME DIFFERENCE MEASUREMENTS

CROSS REFERENCE TO RELATED APPLICATIONS

This application claims the benefit of and priority to U.S. Provisional Patent Application No. 62/543,630 filed Aug. 10, 2017, entitled "PROVISION AND USE OF GAPS FOR RSTD MEASUREMENTS FOR eMTC/FeMTC UEs." Further, this application claims the benefit of and priority under 35 U.S.C. § 119 to Indian Patent Application No. 201741028437 filed Aug. 10, 2017, entitled "PROVISION AND USE OF GAPS FOR RSTD MEASUREMENTS FOR eMTC/FeMTC UEs." All of the above applications are assigned to the assignee hereof and incorporated by reference herein in their entireties.

FIELD

The subject matter disclosed herein relates to User Equipment (UE) location determination, and, in particular, to the provision and use of gaps for Reference Signal Time Difference (RSTD) measurements for enhanced Machine Type Communication (eMTC) and/or Further enhanced Machine Type Communication (FeMTC) UEs.

BACKGROUND

It is often desirable to know the location of a User Equipment (UE), which may take the form of a mobile terminal, or a Bandwidth reduced-Low complexity (BL) UEs, or an Internet of Things (IoT) device. BL UEs, which include enhanced Machine Type Communication (eMTC) and/or Further enhanced MTC (FeMTC) devices, may be low complexity and/or low power devices with Machine to Machine (M2M) communication or Machine Type Communication (MTC) functionality. BL UE devices may use positioning services. For example, wearables, asset tracking devices, logistical support devices, etc. may request and/or use positioning services. However, because of cost, power, and location considerations (e.g. deep indoor), BL UE devices may not have access to some location determination solutions (e.g. Satellite Positioning Systems (SPS)). Therefore, methods (e.g. based on terrestrial cellular networks) to provide and improve location related services to UEs (including BL UEs, eMTC UEs, FeMTC UEs, and/or IoT devices) are desirable.

SUMMARY

In some embodiments, a method on a UE may comprise: receiving, at the UE, a Reference Signal Time Difference (RSTD) measurement request; transmitting, from the UE to a Base Station (BS), in response to the RSTD measurement request, a dedicated gap request comprising a requested configuration of one or more dedicated gaps; and receiving, at the UE, in response to the dedicated gap request, a message comprising a dedicated gap configuration.

In another aspect, a User Equipment (UE) may comprise: a transceiver, and a processor coupled to the transceiver, wherein the processor is configured to: receive, at the UE, a Reference Signal Time Difference (RSTD) measurement request; transmit, from the UE to a Base Station (BS), in response to the RSTD measurement request, a dedicated gap request comprising a requested configuration of one or more dedicated gaps; and receive, at the UE, in response to the dedicated gap request, a message comprising a dedicated gap configuration.

In a further aspect, a User Equipment (UE) may comprise: means for receiving, at the UE, a Reference Signal Time Difference (RSTD) measurement request; means for transmitting, from the UE to a Base Station (BS), in response to the RSTD measurement request, a dedicated gap request comprising a requested configuration of one or more dedicated gaps; and means for receiving, at the UE, in response to the dedicated gap request, a message comprising a dedicated gap configuration.

In some embodiments, a non-transitory computer-readable medium may comprise executable instructions to configure a processor on a User Equipment (UE) to: receive, at the UE, a Reference Signal Time Difference (RSTD) measurement request; transmit, from the UE to a Base Station (BS), in response to the RSTD measurement request, a dedicated gap request comprising a requested configuration of one or more dedicated gaps; and receive, at the UE, in response to the dedicated gap request, a message comprising a dedicated gap configuration.

The methods disclosed may be performed by one or more of UEs, base stations, location servers using LPP, LPPe, or other protocols. Embodiments disclosed also relate to software, firmware, and program instructions created, stored, accessed, read, or modified by processors using non-transitory computer readable media or computer readable memory.

BRIEF DESCRIPTION OF THE DRAWINGS

FIG. 7 shows a flowchart of an exemplary method for dedicated gap configuration.

DETAILED DESCRIPTION

Figure 1A:
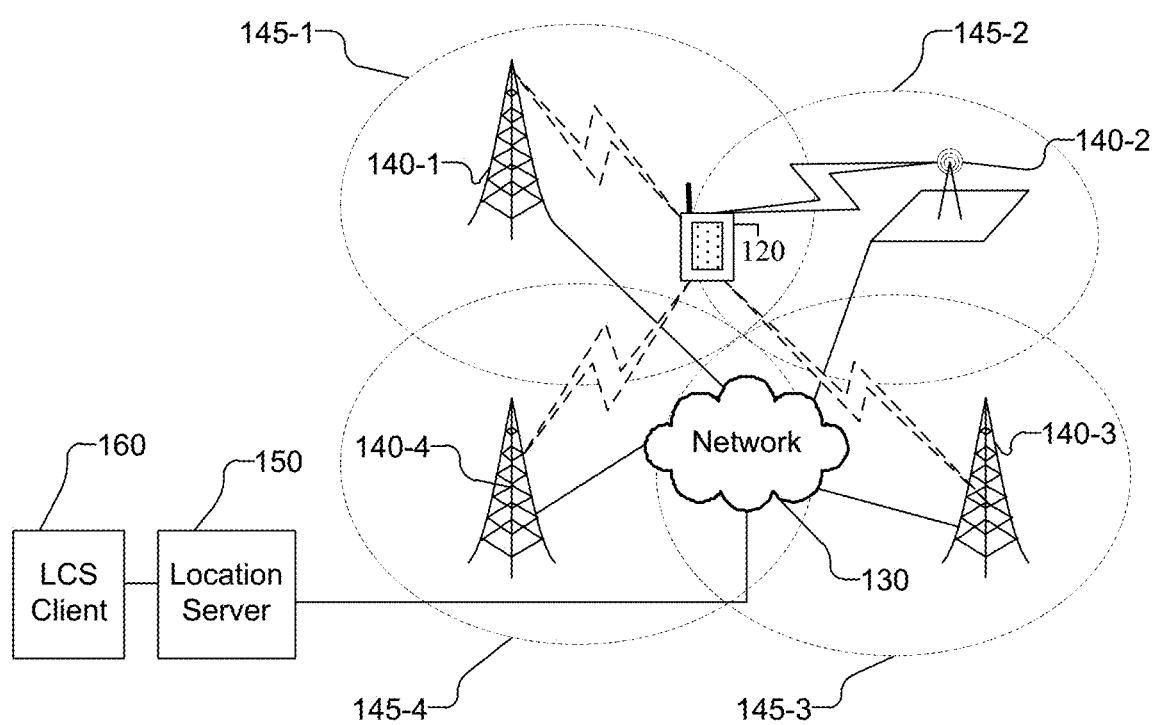
FIG. 1A shows an exemplary system capable of providing Location Services to UEs.

The terms "user equipment" (UE) or "mobile station" (UE), or "target" are used interchangeably herein and may refer to a device such as a cellular or other wireless communication device, BL device, eMTC device, FeMTC device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether assistance data reception, and/or position-related processing occurs at the device or at the PND. The term "communicate," "communicating," or "communication" as used herein refers to sending/transmission, reception, or relaying of signals by an entity; or some combination of sending/transmission, reception, or relaying. The term "location" (also referred to as a "position") as used herein may refer to a geodetic location that may comprise coordinates (e.g. latitude, longitude, and possibly altitude) and optionally an expected error or uncertainty for the location. A geodetic location may be absolute (e.g. comprise a latitude and longitude) or may be relative to some other known absolute location. A location may also be civic and comprise a place name, street address or other verbal description or definition.

In Observed Time Difference of Arrival (OTDOA) based positioning, the UE may measure time differences in received signals from a plurality of base stations such as evolved NodeBs (eNBs). Because positions of the base stations can be known, the observed time differences may be used to calculate the location of the UE. To further help location determination, Positioning Reference Signals (PRS) are often provided by a base station (BS) in order to improve OTDOA positioning performance. The measured time difference of arrival of the PRS from a reference cell (e.g. the serving cell) and one or more neighboring cells is known as the Reference Signal Time Difference (RSTD). Using the RSTD measurements, the absolute or relative transmission timing of each cell, and the known position(s) of BS physical transmitting antennas for the reference and neighboring cells, the UE's position may be determined.

The term Internet of Things (IoT) is often used to refer to systems that facilitate machine-to-machine (M2M) connectivity between devices. The interconnected devices may include a variety of sensors, measurement devices (e.g. utility meters, parking meters, etc.), appliances, vehicles, etc. Some positioning techniques for Location Based Services (LBS) using cellular systems to provide low power and wide area device connectivity (e.g. for IoT devices) were developed by an organization known as the 3rd Generation Partnership Project (3GPP). Specifically, 3GPP Release13 includes features that leverage functionality in existing LTE networks to facilitate coverage extension, reduction in UE complexity, longer UE battery life, etc. In particular, 3GPP Release 13 outlines standards for 3GPP MTC technologies including enhanced MTC (eMTC), which is also called Long-Term Evolution (LTE) MTC (or "LTE-M"). eMTC, which reuses portions of LTE physical layer procedures, facilitates support for IoT services. Accordingly, eMTC UEs may be deployed on existing LTE networks by appropriately configuring base stations (e.g. eNBs).

Physical channels and signals transmitted or received by an eMTC UE may be contained in a much narrower (e.g. 1.08 MHz) bandwidth (with a carrier bandwidth of 1.4 MHz) and facilitate data rates of up to 1 Mbps. Thus, eMTC UEs operate within a new frequency band termed a "narrowband." The eMTC narrowband may include a predefined set of six contiguous Resource Blocks (RBs). The eMTC UE can be served by a cell with a larger bandwidth but the physical channels and signals transmitted or received by the eMTC UE are contained in the 1.08 MHz narrowband with the predefined set of six contiguous RBs.

Typically, LTE PRS signals are mapped to the central resource blocks of an LTE carrier. The number of the LTE PRS resource blocks can vary. For example, the number of LTE PRS resource blocks can be 6, 15, or some specified higher number of RBs. Bandwidth reduced low complexity UEs (e.g. eMTC UEs) may receive a 6-RB wide signal. However, in an effort to offset the reduced bandwidth limitations, 3GPP Release 13 also introduced frequency hopping among different narrowbands (e.g. for eMTC UEs). A base station (e.g. eNB) may configure, for example, two or four narrowbands for frequency hopping within the wider LTE transmission band, where the first narrowband may occupy the center of the LTE transmission band. As outlined above, each narrowband may consist of 6 RBs. Thus, the frequency of the transmitted PRS signal may "hop," for example, at some predetermined interval through the configured (e.g. 2 or 4) narrowbands, which results in PRS frequency hopping.

3GPP Release 14 envisages further enhancements to 3GPP MTC technologies such as FeMTC, which enables dense PRS configurations (e.g. increasing the number of consecutive PRS subframes per positioning occasion) and more frequent PRS transmissions (resulting in reduced PRS periodicity) to allow improved positioning accuracy for eMTC/FeMTC devices. FeMTC UEs may also optionally utilize frequency hopping to add frequency diversity.

Conventionally, UEs may measure PRS during 6 millisecond (ms) measurement gaps, which occur with a periodicity of 40 ms or 80 ms. The term "measurement gap" refers to periods that the UE may use to perform measurements. No uplink (UL) and downlink (DL) transmissions are scheduled during measurement gaps. In some instances, UEs may use "autonomous gaps" to perform measurements. Autonomous gaps refer to periods where a UE may suspend reception and transmission with a base station. Autonomous gaps may be used by UEs to perform measurements within specified time limits. When eMTC/FeMTC UEs use OTDOA based positioning, in some situations, PRS measurement may involve monitoring or tuning (by the UE) to: different frequencies in the narrowbands (intra-frequency), and/or to a different carrier frequency (inter-frequency). For example, the UE serving cell may belong to a frequency layer operating at frequency f1, while PRS' or assistance data cells are deployed on inter-frequency layer operating at frequency f2. With frequency hopping and/or measurements across different frequencies, measurement periods may be longer. For example, the eMTC/FeMTC UE may tune to a new frequency (e.g. f2) from the serving cell at frequency (e.g. f1) to make measurements and then tune back to the serving cell frequency (e.g. f1) to report measurement results, which can increase measurement duration. In the above situations, the UEs may not be able to monitor and/or exchange information over normal data or control channels during the longer measurement period, which may exceed the duration of specified measurement gap or autonomous gap. Moreover, the serving base station (e.g. serving eNB) may be unaware that the UE is configured for positioning and may continue to transmit or unicast data to the UE (e.g. if the measurement duration exceeds the specified measurement gap duration or the specified autonomous gap duration) thereby resulting in data loss. Therefore, some disclosed embodiments facilitate position determination in situations with frequency hopping and/or inter-frequency measurements while decreasing the likelihood of data loss.

In addition, UEs (e.g. eMTC/FeMTC UEs) with the processing capability to measure dense PRS configuration (e.g. longer than 6 ms) and/or measure more frequent PRS transmission (PRS periodicities lower than 40 ms) may not be able to take advantage of the denser PRS configurations and/or the increased frequency of PRS transmissions that may be available with eMTC/FeMTC without risk of data loss. Therefore, disclosed techniques improve position determinations and permit the use of PRS signals for location determination in situations with dense PRS configurations and/or an increased frequency of PRS transmissions.

In some embodiments, a UE may request dedicated gaps with a desired configuration. The term "dedicated gap" may refer to dedicated measurement gaps or dedicated autonomous gaps with some specified configuration (e.g. as requested by a UE and/or as configured by a BS based on a UE request). Autonomous gaps refer to periods where UE may suspend reception and transmission with the base station. For example, the UE may temporarily abort communication with all serving BS' or eNBs and use the dedicated autonomous gaps to perform measurements. The dedicated gap configuration may further include one or more of: a dedicated gap length, a dedicated gap periodicity, and/or a number of dedicated gap instances. Thus, dedicated gaps may differ in duration (gap length), periodicity (gap frequency), and/or number of occurrences from conventional measurement gaps and conventional autonomous gaps. Thus, dedicated gaps may facilitate location determination in environments with dense PRS configurations and/or an increased frequency of PRS transmissions without risk of data loss. In contrast, conventional measurement gaps have default measurement gap lengths and a default measurement gap periodicity, which can encumber UE utilization of: dense PRS configurations and/or an increased frequency of PRS transmissions, in part, because of the risk of data loss. The terms "dedicated measurement gap" or "dedicated autonomous gaps" are also used herein to indicate the type of dedicated gap being discussed.

For example, the UE may request dedicated (measurement or autonomous) gaps of a desired length from a base station such as an eNB. In some embodiments, the dedicated gaps requested by the UE may be contiguous with and/or overlap with network configured dedicated gaps. Upon receiving a response indicating confirmation of dedicated gap configuration (e.g. from the eNB), the UE may utilize the dedicated gaps to perform PRS measurements. During the dedicated gaps, the UE may perform the PRS measurements: (a) for a longer time (e.g. greater than 6 ms); and/or (b) more frequently (e.g. with a periodicity lower than 40 ms). In some embodiments, the UE may perform PRS measurements during the dedicated gaps as indicated by the base station (e.g. eNB) in the response. For example, when the dedicated gaps configured by the BS conform to the dedicated gaps requested by the UE, PRS measurements may be performed during those periods. In some embodiments, the UE dedicated gap request may further specify that the dedicated gaps are being requested for positioning purposes. In some embodiments, the dedicated gaps may be utilized by the UE for inter-frequency PRS measurements. In some embodiments, UE may not monitor data and/or control channels during the configured dedicated gaps, and/or the BS may refrain from transmissions to the UE during configured dedicated gap periods.

Disclosed embodiments also pertain to a base station (e.g. eNB), which may receive requests for dedicated gaps of a specified length from one or more UEs. In some embodiments, the UE dedicated gap requests may further specify that the dedicated gaps are being requested for positioning purposes. In some embodiments, the UE requests may specify that the dedicated gaps are being requested for inter-frequency PRS measurements. In some embodiments, the base station (e.g. eNB) may respond with a message indicating that the request for dedicated gaps has been accepted and/or that the dedicated gaps have been configured with an appropriate length and/or periodicity. In some embodiments, the base station (e.g. eNB) may respond with a message indicating that the request for dedicated gaps has been accepted and/or an indication that the dedicated gaps have been configured with the requested length and/or requested periodicity and/or requested number of instances. In some embodiments, the base station may refrain from transmitting data or control signals to the UE during the configured dedicated gaps.

Figure 1B:
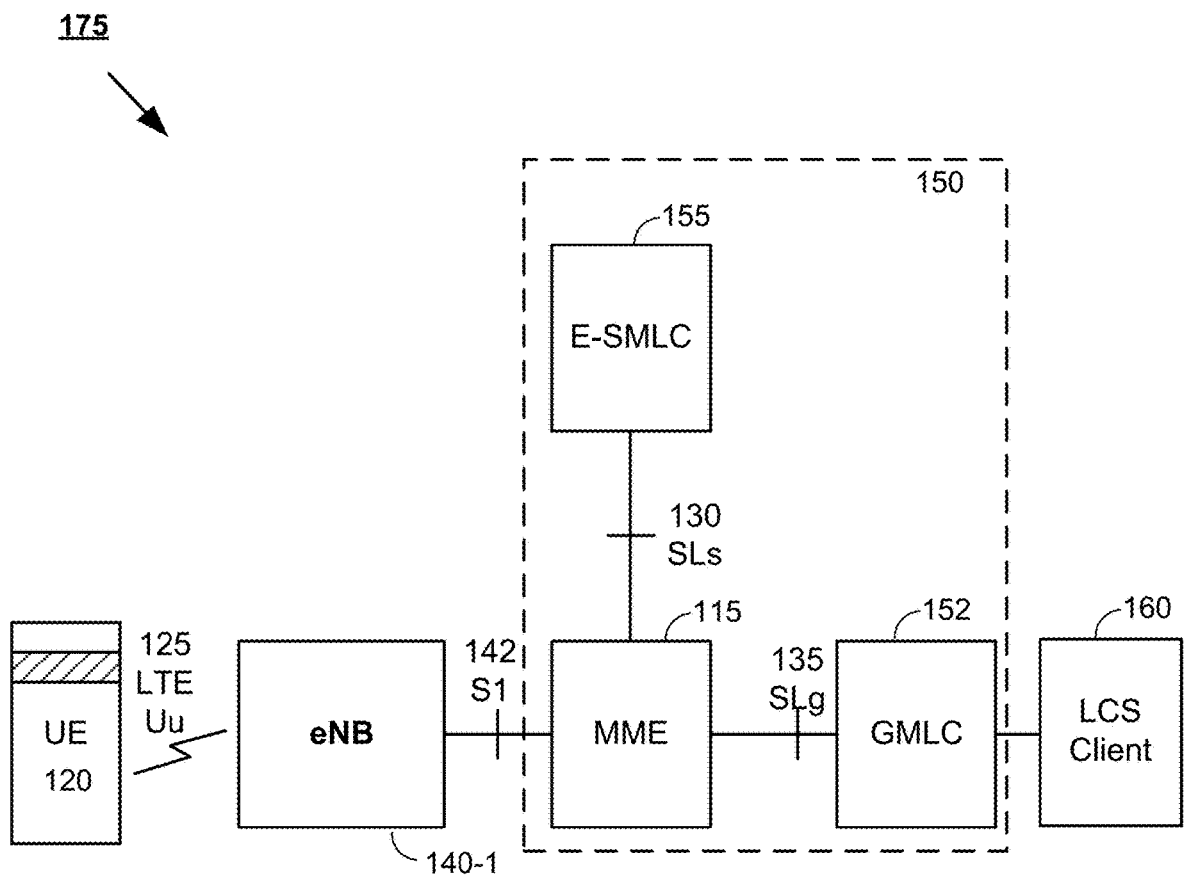
FIG. 1B shows an architecture of an exemplary system capable of providing location services to UEs.

FIG. 1A shows a system 100 capable of providing Location Services to UE 120 including the transfer of location assistance data or location information. FIG. 1B shows an architecture 175 of an exemplary system capable of providing location services to a UE 120 including the transfer of location assistance data or location information. In FIG. 1A and FIG. 1B, one or more of the blocks shown may correspond to logical entities. The logical entities shown in FIG. 1A and FIG. 1B may be physically separate, or, one or more of the logical entities may be included in a single physical server or device. The logical entities and block shown in FIG. 1A and FIG. 1B are merely exemplary and the functions associated with the logical entities/blocks may be split or combined in various ways in a manner consistent with disclosed embodiments.

Referring to FIG. 1A, system 100 may support the transfer of location assistance data or location information, using messages such as Long Term Evolution (LTE) Positioning Protocol (LPP) or LPP extensions (LPPe) messages between UE 120 and location server (LS) 150, which may take the form of an Enhanced Serving Mobile Location Center (E-SMLC) or another network entity. The transfer of the location information may occur at a rate appropriate to both UE 120 and LS 150 or other entity. Further, the LPP Annex (LPPa) protocol may be used for communication between LS 150 (e.g. E-SMLC) and a base station 140 (e.g. eNB).

LPP is well-known and described in various publicly available 3GPP technical specifications (e.g. 3GPP Technical Specification (TS) 36.355 entitled "LTE Positioning Protocol"). In some embodiments, system 100 may form part of, comprise, or contain an Evolved Packet System (EPS), which may comprise an evolved UMTS Terrestrial Radio Access Network (E-UTRAN) and an Evolved Packet Core (EPC). LPPe has been defined by the Open Mobile Alliance (OMA) (e.g. in OMA TS OMA-TS-LPPe-V1_0 entitled "LPP Extensions Specification") and may be used in combination with LPP such that each combined LPP/LPPe message would be an LPP message comprising an embedded LPPe message. LPPa is described in the publicly available 3GPP TS 36.455 document entitled "LTE Positioning Protocol A." In general, a positioning protocol such as LPP and LPPe may be used to coordinate and control position determination. The positioning protocol may define: (a) positioning related procedures that may be executed by LS 150 and/or a UE 120; and/or (b) communication or signaling related to positioning between LS 150 and UE 120. In the case of LPPa, the protocol may be used between LS 150 (e.g. E-SMLC) and BS 140 (e.g. an eNB) to enable LS 150 to request and receive configuration information for the BS 140 (e.g. details of PRS signals transmitted) and positioning measurements made by BS 140 of UE 120.

For simplicity, only one UE 120, four base stations, and LS 150 are shown in FIG. 1A. In general, system 100 may comprise multiple cells indicated by 145-$k$ ($0 \le k \le N_{cells}$, where $N_{cells}$ is the number of cells) with additional networks 130, LCS clients 160, UEs 120, servers 150, and base stations 140. System 100 may further comprise a mix of cells including macrocells such as cells 145-1, 145-3, and 145-4 along with small cells (e.g. femtocells) such as cell 145-2 in a manner consistent with embodiments disclosed herein.

UE 120 may be capable of wirelessly communicating with LS 150 through one or more networks 130 that support positioning and location services, which may include, but are not limited to, the Secure User Plane Location (SUPL) location solution defined by OMA and the Control Plane location solution defined by 3GPP for use with an LTE serving network.

In Control Plane (CP) positioning, the signaling used to initiate a positioning event, and the signaling related to the positioning event occur over the control channels of the cellular network. In CP positioning, the location server may include or take the form of an E-SMLC.

In User Plane (UP) positioning such as Secure User Plane Location (SUPL) positioning, signaling to initiate and perform Location Based Services (LBS) functions may utilize user data channels and appear as user data. In UP positioning, the location server may include or take the form of a SUPL Location Platform (SLP).

For example, location services (LCS) may be performed on behalf of LCS Client 160 that accesses LS 150 and issues a request for the location of UE 120. LS 150 may then respond to LCS client 160 with a location estimate for UE 120. LCS Client 160 may also be known as a SUPL Agent—e.g. when the location solution used by LS 150 and UE 120 is SUPL. In some embodiments, UE 120 may also include an LCS Client or a SUPL agent (not shown in FIG. 1A) that may issue a location request to some positioning capable function within UE 120 and later receive back a location estimate for UE 120. The LCS Client or SUPL Agent within UE 120 may perform location services for the user of UE 120—e.g. provide navigation directions or identify points of interest within the vicinity of UE 120. In some embodiments, LS 150 may be a SUPL Location Platform (SLP), E-SMLC, a Serving Mobile Location Center (SMLC), a Gateway Mobile Location Center (GMLC), a Position Determining Entity (PDE), a Standalone SMLC (SAS), and/or the like.

As illustrated in FIG. 1A, the UE 120 may communicate with LS 150 through network 130 and base stations 140, which may be associated with network 130. UE 120 may receive and measure signals from base stations 140, which may be used for position determination. For example, UE 120 may receive and measure signals from one or more of base stations 140-1, 140-2, 140-3, and/or 140-4, which may be associated with cells 145-1, 145-2, 145-3, and 145-4, respectively. In some embodiments, base stations 140 may form part of a wireless communication network, which may be a wireless wide area network (WWAN), wireless local area network (WLAN), a wireless personal area network (WPAN), and so on.

A WWAN may be a cellular network such as one with support for 3GPP MTC technologies. A WWAN may include networks based on LTE, LTE-M, and/or variants thereof. LTE-M or eMTC is based on LTE and incorporates features to support services for IoT devices and BL UEs. LTE-M/eMTC reuse portions of LTE physical and can be deployed on existing LTE networks by appropriately configuring base stations (e.g. eNB 140-1). Further, physical channels and signals transmitted or received by an eMTC UE (e.g. UE 120) may be contained in a much narrower (e.g. 1.08 MHz) bandwidth (with a carrier bandwidth of 1.4 MHZ) and facilitate data rates of up to 1 Mbps. Thus, eMTC UEs (which are also called "Category M1 UEs") operate within a new frequency band termed a "narrowband." The eMTC narrowband may include a predefined set of six contiguous Resource Blocks. 3GPP Release 14 envisages enhancements to 3GPP MTC technologies such as FeMTC, which enables dense PRS configurations (e.g. increasing the number of consecutive PRS subframes per positioning occasion) and more frequent PRS transmissions (reduced PRS periodicity) to allow improved positioning accuracy for eMTC/FeMTC devices. FeMTC UEs (which are also called "Category M2 UEs") may optionally utilize frequency hopping to add frequency diversity.

A local area network (LAN) may be an Institute of Electrical and Electronics Engineers (IEEE) 802.3x network, for example. A WLAN may be an IEEE 802.11x network. A WPAN may be a Bluetooth network, an IEEE 802.15x, or some other type of network.

FIG. 1B shows an architecture 175 of an exemplary system capable of providing location services to a UE 120 including the transfer of location assistance data or location information. For simplicity, only one UE 120, eNB 140-1, and LS 150 are shown in FIG. 1B. In general, the architecture may comprise multiple UEs, eNBs, etc. in a manner consistent with embodiments disclosed herein. Further, in FIG. 1B, LS 150 is shown (using dashed lines) as potentially including functionality of E-SMLC 155, Mobility Management Entity (MME) 115 and Gateway Mobility Location Center (GMLC) 152. However, as outlined above, the logical entities and blocks shown in FIG. 1B are merely exemplary and the functions associated with the logical entities/blocks may be split or combined in various ways in a manner consistent with disclosed embodiments.

FIG. 1B shows eNB 140-1, MME 115, E-SMLC 155, and GMLC 152. As shown in FIG. 1, UE 120 may be capable of receiving wireless communication from eNBs 140-1 over radio interface LTE-Uu 125. Radio interface LTE-Uu 125 may be used between UE 120 and eNB 140-1. In some embodiments, eNB 140-1 may be configured to transmit PRS signals, which may be received by UE 120. In some embodiments, eNB 140-1 may communicate with an Operations and Maintenance (O&M) system (not shown in FIG. 1B) with regard to available Physical Cell Identifiers (PCIs) and/or a PRS signal configuration for eNB 140.

As outlined in LTE Release 9, eNB 140-1 may transmit PRS with a periodicity of one of: 160, 320, 640, or 1280 subframes where the duration of each positioning occasion may be one of: 1, 2, 4, or 6 subframes. In some embodiments, LS 150 or E-SMLC 155 may provide OTDOA assistance information to UE 120, which may facilitate PRS measurement by UE 120.

In some embodiments, the PRS signals transmitted by eNB 140-1 may further be compliant with LTE and/or LTE MTC (e.g. LTE Release 13/eMTC and/or LTE Release 14/FeMTC) standards. When signals transmitted by eNB 140-1 are compliant with LTE-M (e.g. LTE Release 13/eMTC and/or LTE Release 14/FeMTC), PRS may be transmitted with a periodicity of one of: 10, 20, 40, 80, 160, 320, 640, or 1280 subframes, and where the duration of each positioning occasion may be one of: 2, 4, 6, 10, 20, 40, 80, or 160 subframes.

In some instances, UE 120, such as a BL UE or MTC UE or FeMTC UE may measure PRS during 6 ms conventional measurement gaps, which occur with a periodicity of 40 ms. However, when PRS broadcasts include dense PRS configurations (e.g. increased number of consecutive PRS subframes per positioning occasion) and/or more frequent PRS transmissions (reduced PRS periodicity), UEs 120 (e.g. eMTC UE and/or FeMTC UEs) may request dedicated (autonomous or measurement) gaps of appropriate length (e.g. based on one or more of the UEs signal environment, processing capability, and/or desired positioning accuracy) from eNB 140-1. In some embodiments, UE 120 may request dedicated measurement gaps of a desired length from eNB 140-1 and may specify that the dedicated measurement gaps are being requested for inter-frequency PRS measurements.

In some embodiments, the dedicated measurement gaps requested by the UE may be contiguous with and/or overlap with network configured measurement gaps. Upon receiving a response indicating a configuration of dedicated gaps from eNB 140-1, UE 120 may utilize the dedicated gaps to perform PRS measurements. UE 120 (e.g. BL UE or MTC UE or FeMTC UE) may perform the PRS measurements: (a) for a longer time (e.g. greater than 6 ms); and/or (b) more frequently (e.g. with a periodicity lower than 80 ms or 40 ms). In some embodiments, UE 120 may perform PRS measurements during the dedicated gaps as indicated by eNB 140-1 in the response. For example, when the dedicated gaps conform to the dedicated gaps requested by UE 120, PRS measurements may be performed during those periods. In some embodiments, the UE request may specify that the dedicated gaps are being requested for positioning purposes. In some embodiments, the dedicated gaps may also be utilized by UE 120 to facilitate inter-frequency PRS measurements. In some embodiments, UE 120 may not monitor data and control channels during dedicated gaps.

Conversely, eNB 140-1 may receive requests for dedicated gaps of a specified length from UE 120-1. In some embodiments, the received UE request may further specify that the dedicated gaps are being requested for positioning purposes. In some embodiments, the received UE request may specify that the dedicated gaps are being requested for inter-frequency PRS measurements. In some embodiments, eNB 140-1 may respond to UE 120 by transmitting a message indicating that the request for dedicated gaps has been accepted and/or that the dedicated gaps have been configured with some specified dedicated gap length and/or dedicated gap periodicity. In some embodiments, eNB 140-1 may respond by transmitting a message indicating that the request for dedicated gaps has been accepted and/or that the dedicated gaps have been configured with the requested length and/or requested periodicity. In some embodiments, eNB may refrain from transmissions to UE during the configured dedicated gaps. In some embodiments, the eNB may not expect UE 120 to monitor and/or respond to transmissions on data and control channels during dedicated gaps.

In some embodiments, an eNB 140 may communicate with a Mobility Management Entity (MME) 115 over S1 interface 142 (defined in 3GPP TS 36.413 entitled "S1 Application Protocol") between an MME and eNB. In some embodiments, S1 interface 142 may include an S1 CP interface and an S1 UP interface. MME 115 may support location sessions with a location server such as E-SMLC 155 to provide location services for UE 120.

In some embodiments, MME 115 and E-SMLC 155 may communicate over SLs interface 130. UE 120 may exchange LCS-related messages (e.g. LPP and/or LPP/LPPe messages) with the E-SMLC 155 to obtain location services. The LCS-related messages may be forwarded through an eNB 140 and MME 115. In some embodiments, MME 115 may also support UE/subscriber mobility within a cell, as well as support for mobility between cells/networks.

In some embodiments, E-SMLC 155 may determine a (network based or UE-assisted) location of UEs 120. E-SMLC 155 may use measurements of radio signals such as Positioning Reference Signals (PRS) (which may be provided by a UE 120) to help determine the location of a UE 120. In some embodiments, LS 150 or E-SMLC 155 may provide location assistance information including OTDOA assistance information to UE 120, which may facilitate PRS measurement by UE 120. In some embodiments, an MME 115 may communicate with Gateway Mobility Location Center (GMLC) 145 over SLg interface 135.

In some embodiments, a GMLC 145 may provide an interface to external clients such as LCS Client 160. LCS Client 160 may request a location of UE 120 to support Location Based Services (LBS). In some embodiments, GMLC 145 may support interfacing with LCS clients 160 and include functionality required to support LBS. GMLC 145 may forward positioning requests related to UE 120 from LCS Client 160 to an MME 115 serving UE 120 over SLg interface 135. GMLC 145 may also forward location estimates for UE 120 to LCS Client 160.

Accordingly, in FIG. 1B, as an example, LCS Client 160 may initiate a location services request to determine the location of UE 120. The location services request may be forwarded by GMLC 152 to MME 115. MME 115 may forward the request to E-SMLC 155, which may process the request and communicate with UE 120 (e.g. via eNB 140-1) and request RSTD measurements. In some instances, UE 120 may request OTDOA assistance information for PRS measurement from E-SMLC 155. E-SMLC 155 may respond with the requested OTDOA assistance data. In some instances, UE 120 may request dedicated measurement gaps from E-SMLC 155 to perform the requested measurements. In some embodiments, eNB 140-1 may respond transmitting a message to UE 120 with the OTDOA assistance information and/or indicating that the dedicated measurement gaps have been configured.

UE 120 may then perform the requested measurements in the dedicated measurement gaps (as configured) and transmit the RSTD measurements (e.g. via eNB 140-1) to E-SMLC 155, which may estimate the position of UE 120 based on the RSTD measurements. E-SMLC may send the estimated position of UE 120 to MME 115, which may forward the result GMLC 152 for transmission to LCS Client 160. For example, UE 120 may measure the difference in the arrival times of downlink (DL) PRS signals from a plurality of base stations (such as eNBs 140) relative to a reference signal. For example, if a reference signal from base station 140-1 is received at time t1, and a signal from base station 140-3 is received at time t2, then the RSTD is given by t2−t1. Generally, t2 and t1 are known as Time Of Arrival (TOA) measurements.

Figure 2A:
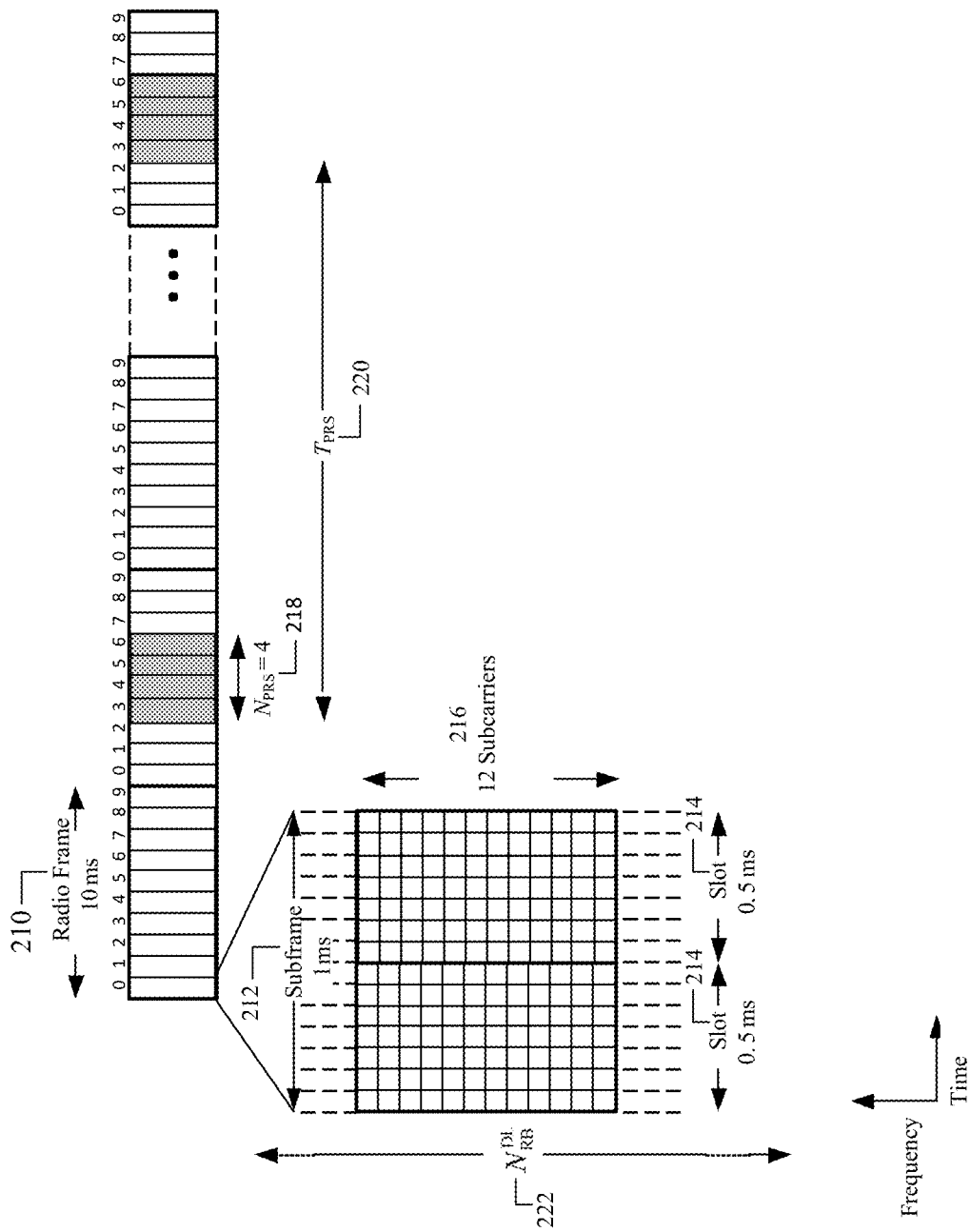
FIG. 2A shows the structure of an exemplary LTE frame with PRS occasions.

FIG. 2A shows the structure of an exemplary LTE frame with PRS occasions. In FIG. 2A, time is shown on the X (horizontal) axis, while frequency is shown on the Y (vertical) axis. As shown in FIG. 2A, downlink and uplink LTE Radio Frames 210 are of 10 ms duration each. For downlink Frequency Division Duplex (FDD) mode, Radio Frames 210 are organized into ten subframes 212 of 1 ms duration each. Each subframe 212 comprises two slots 214, each of 0.5 ms duration.

Figure 3A:
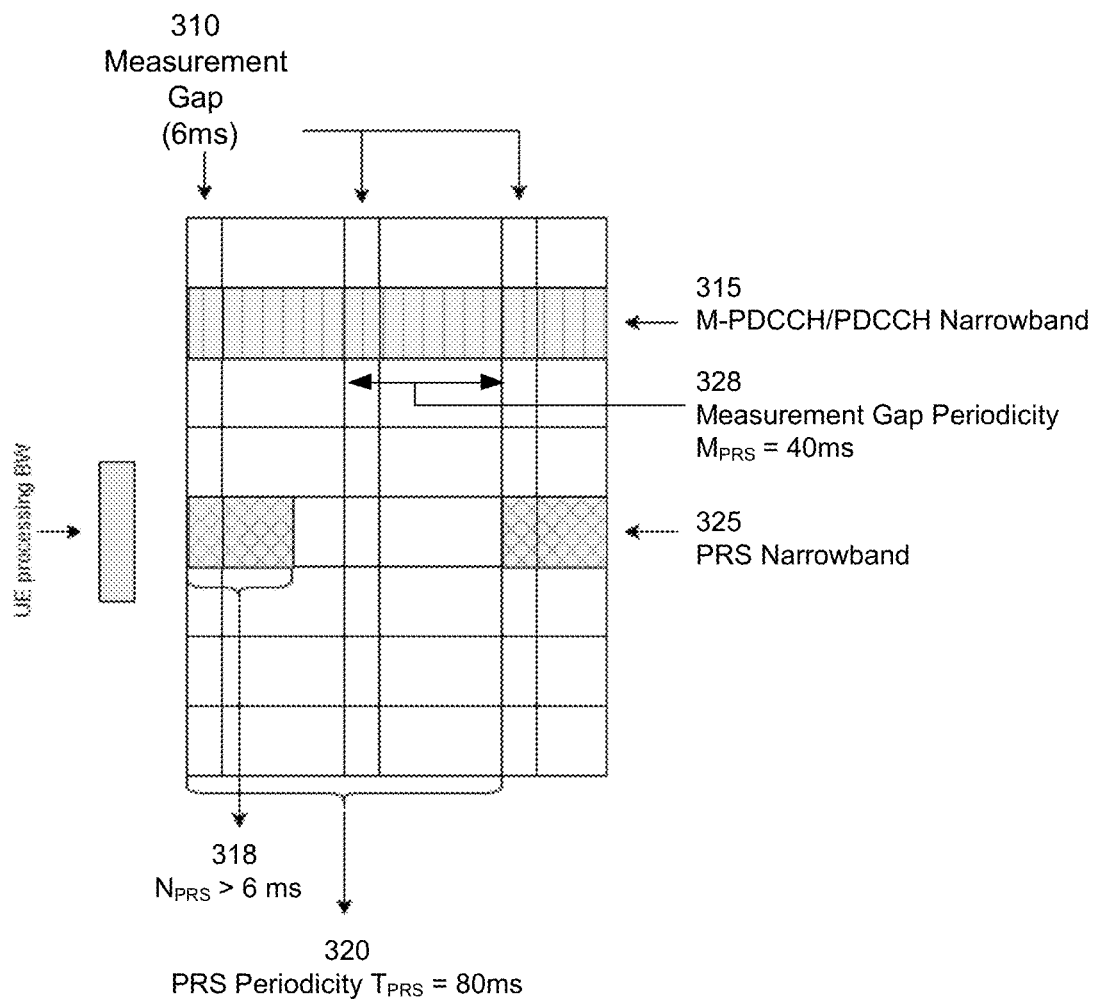
FIG. 3A and FIG. 3B illustrate LTE-M PRS transmission.

In the frequency domain, the available bandwidth may be divided into uniformly spaced orthogonal subcarriers 216. For example, for a normal length cyclic prefix using 15 KHz spacing, subcarriers 216 may be grouped into a group of 12. Each grouping, which comprises 12 subcarriers 216, in FIG. 3A, is termed a resource block and in the example above the number of subcarriers in the resource block may be written as $N_{SC}^{RB}=12$. For a given channel bandwidth, the number of available resource blocks on each channel 222, which is also called the transmission bandwidth configuration 222, is given by $N_{RB}^{DL}$ 222. For example, for a 3 MHz channel bandwidth in the above example, the number of available resource blocks on each channel 222 is given by $N_{RB}^{DL}=15$.

Referring to FIG. 1A, in some embodiments, base stations 140-1-140-4 corresponding to cells 145-1-145-4, respectively, may transmit Positioning Reference Signals (PRS). LTE PRS, which have been defined in 3GPP Long Term Evolution (LTE) Release-9, are transmitted by a base station in special positioning subframes that are grouped into positioning occasions. For example, in LTE PRS, the positioning occasion, $N_{PRS}$ can comprise 1, 2, 4, or 6 consecutive positioning subframes ($N_{PRS} \in \{1, 2, 4, 6\}$) and occurs periodically at 160, 320, 640, or 1280 millisecond intervals. In the example shown in FIG. 2A, the number of consecutive positioning subframes 18 is 4 and may be written as $N_{PRS}=4$. The positioning occasions recur with a PRS Periodicity denoted as $T_{PRS}$ 220 in FIG. 2A. In some embodiments, $T_{PRS}$ 220 may be measured in terms of the number of subframes between the start of consecutive positioning occasions.

Within each positioning occasion, PRSs are transmitted with a constant power. PRS can also be transmitted with zero power (i.e., muted). Muting, which turns off a regularly scheduled PRS transmission, may be useful when PRS patterns between cells overlap. Muting aids signal acquisition by UE 120. Muting may be viewed as the non-transmission of a PRS for a given positioning occasion in a particular cell. Muting patterns may be signaled to UE 120 using bitstrings. For example, in a bitstring signaling a muting pattern, if a bit at position j is set to "0," then an UE may infer that the PRS is muted for the $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of the Physical Cell Identifier (PCI) resulting in an effective frequency re-use factor of 6.

The PRS configuration parameters such as the number of consecutive positioning subframes, periodicity, muting pattern, etc. may be configured by network 130 and may be signaled to UE 120 (e.g. by LS 150) as part of the OTDOA assistance data. For example, LPP or LPPe messages between UE 120 and LS 150 may be used to transfer location assistance data including OTDOA assistance data. OTDOA assistance data may include reference cell information and neighbor cell lists. The reference cell and neighbor cell lists may each contain the PCIs of the cells as well as PRS configuration parameters for the cells.

OTDOA assistance data are usually provided for one or more "neighbor cells" or "neighboring cells" relative to a "reference cell." For example, OTDOA assistance data may include "expected RSTD" parameters, which provide the UE information about the RSTD values the UE is expected to measure at its current location together with an uncertainty of the expected RSTD parameter. The expected RSTD together with the uncertainty defines then a search window for the UE where the UE is expected to measure the RSTD value. "Expected RSTDs" for cells in the OTDOA assistance data neighbor cell list are usually provided relative to an OTDOA assistance data reference cell. OTDOA assistance information may also include PRS configuration information parameters, which allow a UE to determine when a PRS positioning occasion occurs on signals received from various cells, and to determine the PRS sequence transmitted from various cells in order to measure a TOA.

Figure 2B:
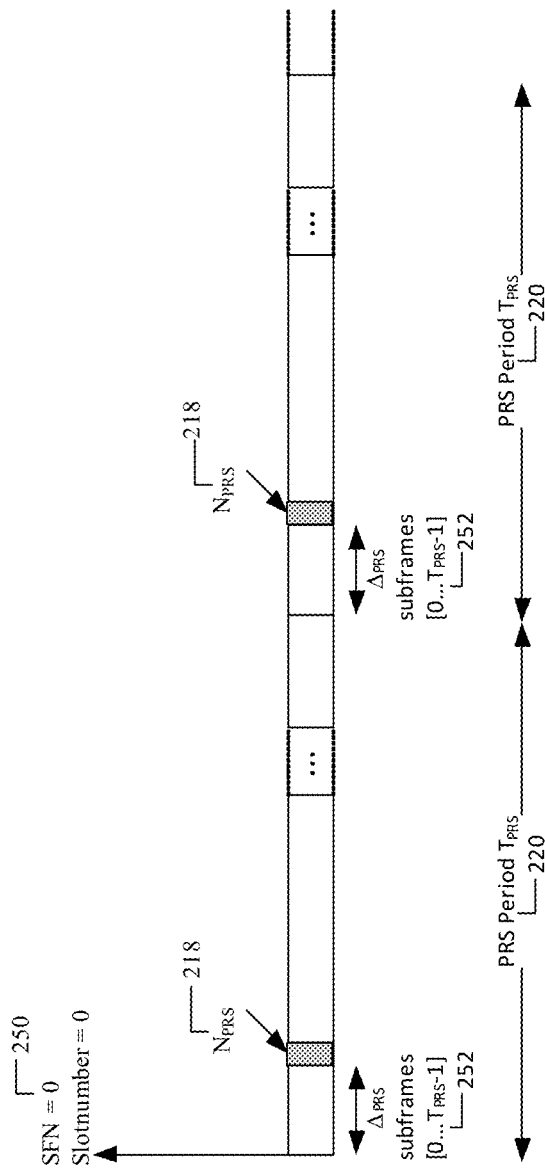
FIG. 2B illustrates the relationship between the System Frame Number (SFN), the cell specific subframe offset and the PRS Periodicity.

FIG. 2B illustrates the relationship between the System Frame Number (SFN), the cell specific subframe offset and the PRS Periodicity $T_{PRS}$ 220. Typically, the cell specific PRS subframe configuration is defined by a "PRS Configuration Index" $I_{PRS}$ included in the OTDOA assistance data. The cell specific subframe configuration period and the cell specific subframe offset for the transmission of positioning reference signals are defined based on the $I_{PRS}$, in the 3GPP Release 9 specifications listed in Table 1 below.

TABLE 1

LTE (Release 9) Positioning reference signal subframe configuration

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | Reserved | |

PRS configuration is defined with reference to the System Frame Number (SFN) of a cell that transmits PRS. PRS instances, for the first subframe of downlink subframes, satisfy $$(10 \times n_f + \lfloor n_s/2 \rfloor - \Delta_{PRS}) \mod T_{PRS} = 0, \quad (1)$$

where, $n_f$ is the SFN with $0 \leq SFN \leq 1023$, $n_s$ is the slot number of the radio frame with $0 \leq n_s \leq 19$, $T_{PRS}$ is the PRS period, and $\Delta_{PRS}$ is the cell-specific subframe offset.

As shown in FIG. 2B, the cell specific subframe offset $\Delta_{PRS}$ 252 may be defined in terms of the number of subframes transmitted starting from System Frame Number 0, Slot Number 0 250 to the start of a PRS positioning occasion. In FIG. 2B, the number of consecutive positioning subframes 218, $N_{PRS}=4$.

In some embodiments, when UE 120 receives a PRS configuration index $I_{PRS}$ in the OTDOA assistance data, UE 120 may determine PRS periodicity $T_{PRS}$ 220 and PRS subframe offset $\Delta_{PRS}$ 252 using Table 1. Upon obtaining information about the frame and slot timing i.e. the SFN and slot number ($n_f$, $n_s$) for cell 145-k, UE 120 may determine the frame and slot when a PRS is scheduled in cell 145-k. The OTDOA assistance data is determined by LS 150 and includes assistance data for a reference cell, and a number of neighbor cells.

Typically, PRS occasions from all cells 145 in network 130 are aligned in time. In SFN-synchronous networks all evolved NodeBs (eNBs) are aligned on both, frame boundary and system frame number. Therefore, in SFN-synchronous networks all cells use the same PRS configuration index. On the other hand, in SFN-asynchronous networks all eNBs are aligned on frame boundary, but not system frame number. Thus, in SFN-asynchronous networks the PRS configuration index for each cell is configured by the network so that PRS occasions align in time.

UE 120 may determine the timing of the PRS occasions of the assistance data cells, if UE 120 can obtain the cell timing (e.g., SFN or Frame Number) of at least one of the assistance data cells. The timing of the other assistance data cells may then be derived by UE 120, for example based on the assumption that PRS occasions from different cells overlap.

UE 120 may obtain the cell timing (SFN) of one of the reference or neighbor cells in OTDOA assistance data in order to calculate the frame and slot on which the PRS is transmitted. For example, as specified in the LPP, the cell serving UE 120 (the serving cell) may be included in the OTDOA assistance data, either as a reference cell or as an assistance data neighbor cell, because the SFN of the serving cell is always known to UE 120.

Further, as noted above, PRS may be muted in certain subframes. The PRS muting configuration of a cell, as specified by the LPP, is defined by a periodic muting sequence with periodicity $T_{REP}$ where $T_{REP}$, which is counted in terms of the number of PRS positioning occasions, can be 2, 4, 8, or 16. The first bit of the PRS muting sequence corresponds to the first PRS positioning occasion that starts after the beginning of the assistance data reference cell SFN=0. The PRS muting configuration is represented by a bit string of length 2, 4, 8, or 16 bits (corresponding to the selected $T_{REP}$), and each bit in this bit string can have the value "0" or "1." If a bit in the PRS muting is set to "0," then the PRS is muted in the corresponding PRS positioning occasion. Therefore, for OTDOA PRS positioning by UE 120 is facilitated obtaining the cell timing (SFN) of the reference cell.

Thus, in LTE PRS (e.g. as in Release 9), periodic positioning occasions occur with a periodicity of one of: 160, 320, 640, or 1280 subframes and the length of each positioning occasion is one of: 1, 2, 4, or 6 subframes. Further, in LTE, PRS may be fixed at the center of the LTE carrier and muting may be accomplished using a bit string of 2, 4, 8, or 16 bits, with each bit being applied to one positioning occasion.

LTE-M or eMTC is based on LTE and incorporates features to support services for IoT devices and BL UEs. LTE-M/eMTC, reuses portions of LTE physical layer procedures and can be deployed on existing LTE networks by appropriately configuring base stations (e.g. eNB 140-1). Further, physical channels and signals transmitted or received by an eMTC UE may be contained in a much narrower (e.g. 1.08 MHz) bandwidth (with a carrier bandwidth of 1.4 MHZ) and facilitate data rates of up to 1 Mbps. Thus, eMTC UEs operate within a new frequency band termed a "narrowband." The eMTC narrowband may include a predefined set of six contiguous Resource Blocks. eMTC UEs may be served by a cell with a larger bandwidth but the physical channels and signals transmitted or received by the eMTC UE are contained in the 1.08 MHz narrowband with the predefined set of six contiguous Resource Blocks. Further, Release 13 introduced frequency hopping among different narrowbands was introduced. In frequency hopping, the same signal is transmitted using different sets of 6 RBs each within the LTE transmission band. Thus, the frequency of the transmitted signal may "hop," for example, at some predetermined interval. 3GPP Release 14 envisages enhancements to 3GPP MTC technologies such as FeMTC, which enables dense PRS configurations (e.g. increasing the number of consecutive PRS subframes per positioning occasion) and more frequent PRS transmissions (reduced PRS periodicity) to allow improved positioning accuracy for eMTC/FeMTC devices. Both eMTC and FeMTC UEs may optionally utilize frequency hopping to add frequency diversity, which facilitates improvements to throughput, received Signal to Interference plus Noise Ratio (SINR) and extending coverage.

FIG. 3A illustrates an LTE-M PRS transmission, where time is shown on the X-axis and frequency is shown on the Y-axis. As shown in FIG. 3A, control and data transmissions may occur over the MTC Physical Downlink Control Channel (M-PDCCH) or the Physical Downlink Control Channel (PDCCH) narrowband 315. For example, the transmissions may be monitored and/or received by a UE 120, which may be a BL UE or an eMTC/FeMTC UE. Further, PRS transmissions may occur over PRS narrowband 325. As shown in FIG. 3A, MPDCCH/PDCCH narrowband 315 may not be aligned with PRS narrowband 325.

Further, as also shown in FIG. 3A, the PRS transmissions may be dense with the number of consecutive PRS subframes $N_{PRS}$ 318 being greater than 6 ($N_{PRS}>6$). PRS transmissions may occur with a PRS periodicity $T_{PRS}$ 320 of 80 ms ($T_{PRS}=80$ ms). Further, in FIG. 3A, measurement gaps 310 are shown as being of 6 ms duration each and occurring with Measurement Gap Periodicity $M_{PRS}$ 328, where $M_{PRS}=40$ ms.

Referring to FIG. 3A, even if a UE (e.g. an eMTC or FeMTC UE) is capable of dense PRS measurement, then conventionally, the UE may only make measurements during the 6 ms measurement gaps 310 without risk of data loss. Thus, conventionally, the UE may measure at most 6 PRS subframes during any 6 ms measurement gap 310 thereby limiting accuracy and inhibiting optimal utilization of UE functionality.

Because UL and DL transmissions are only guaranteed to be absent during measurement gaps, if a UE measures (or attempts to measure) more than 6 PRS subframes (i.e. the measurement exceeds the 6 ms measurement gap 310), then, in conventional situations, UE 120 may risk data loss during the measurement period. Moreover, UEs (e.g. a BL UE or an eMTC UE or FeMTC UE) may tune to PRS narrowband 325 (intra-frequency) to monitor PRS transmissions and may not be able to monitor or transmit on the M-PDCCH or the PDCCH narrowband 315. For example, a BL UEs processing bandwidth may not be adequate to monitor M-PDCCH/PDCCH narrowband 315 and PRS narrowband 315 simultaneously.

In some instances, a network (e.g. network 130) may consist of several frequency layers. For example, in FIG. 1A, macrocells 145-1, 145-3 and 145-4 may operate on radio frequency f2, while femtocells such as cell 145-2 may operate on a radio frequency f1. Further, PRS may also be configured and deployed on frequency layer f2. Thus, in the inter-frequency example above, in conventional systems, UE 120 may: (i) stop transmission/reception on the serving cell carrier; (ii) tune the receiver to the frequency (f2) of the neighbor cell carrier; (iii) synchronize to the neighbor cell; (iv) decode the MIB information of the neighbor cell; and (v) tune the receiver back to the serving cell frequency (f1).

Because the UE has stopped transmission/reception on the serving cell, information transmitted by base stations (such as eNBs) during the measurement period may be lost. Data loss occurs because the base station may not have visibility into positioning related signaling that occurs between UEs and LS 150 or UE and E-SMLC 155, therefore the base station may not be aware of the OTDOA related positioning requests/measurements. Thus, the base station may continue transmissions to the UE during the measurement period, which may result in data loss.

Further, measurement gap 310 of 6 ms duration may be insufficient for the UE to tune its frequency to the neighbor cell carrier, search for the Primary Synchronization Signal (PSS) and/or Secondary Synchronization Signal (SSS) to synchronize to the neighbor cell, and to decode the LTE Physical Broadcast Channel (PBCH) in order to read the Master Information Block (MIB) which contains the SFN of the cell. Thus, in conventional systems, the standard 6 ms measurement gap 310 may not be adequate for UE 120 to obtain SFN information of a neighbor cell.

Figure 3B:
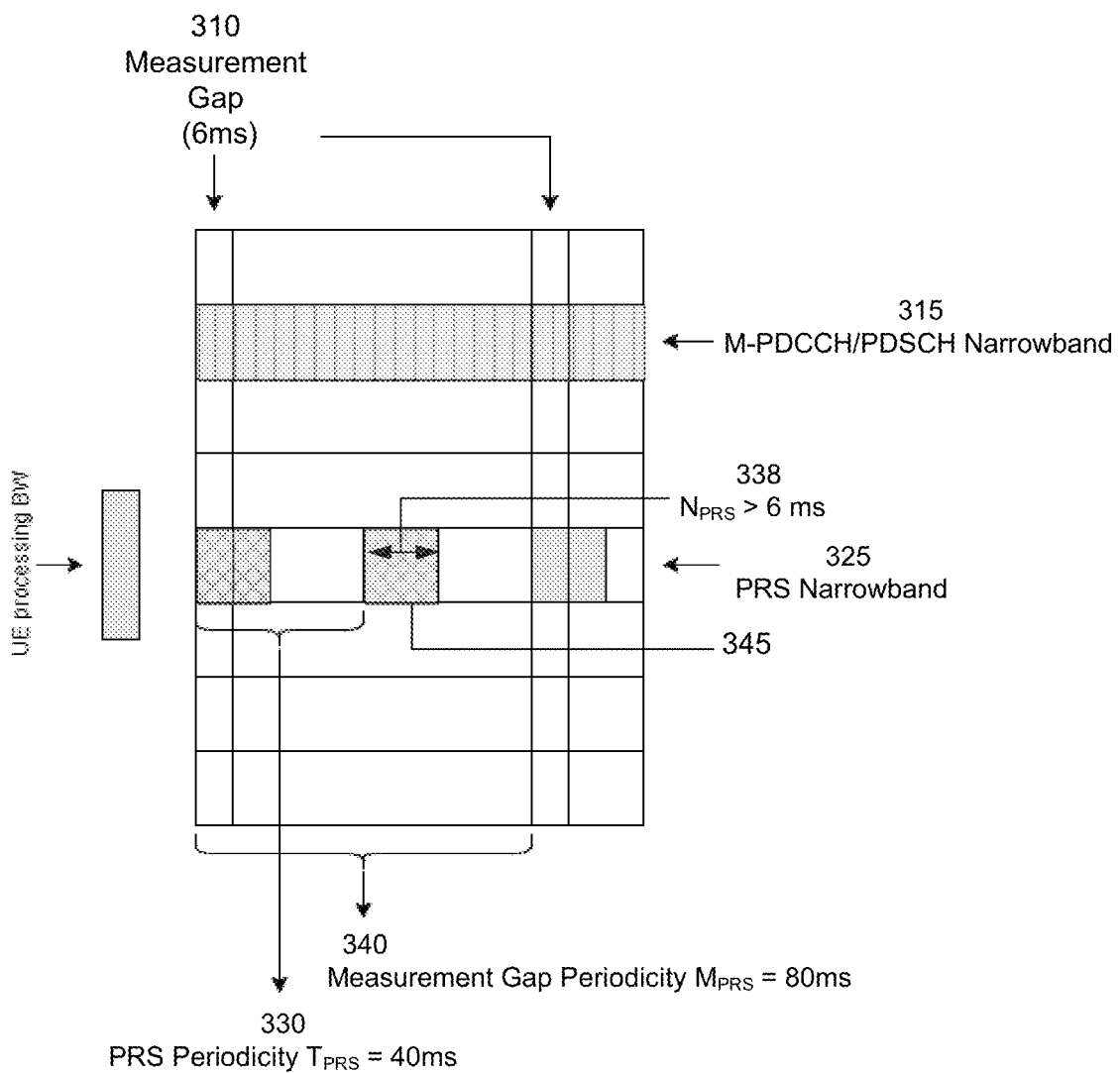

FIG. 3B illustrates an LTE-M PRS transmission. As shown in FIG. 3B, control and data transmissions may occur over the MTC Physical Downlink Control Channel (M-PDCCH) or the Physical Downlink Control Channel (PDCCH) narrowband 315. For example, the transmissions may be monitored and/or received by a UE 120, which may be a BL UE or an eMTC/FeMTC UE. Further, PRS transmissions may occur over PRS narrowband 325. As shown in FIG. 3B, the PRS transmissions may be dense with the number of consecutive PRS subframes $N_{PRS}$ 338 being greater than 6 ($N_{PRS}$>6). PRS transmissions may occur with a PRS periodicity $T_{PRS}$ 330 of 40 ms ($T_{PRS}$=40 ms). Further, as shown in FIG. 3A, conventionally, measurement gaps 310 may be of 6 ms duration each and occur with Measurement Gap Periodicity MPRs 340, where $M_{PRS}$=80 ms.

As shown in FIG. 3B, because $M_{PRS}$ 340 is 80 ms ($M_{PRS}$=80 ms), while $T_{PRS}$ 330 is 40 ms ($T_{PRS}$=40 ms), PRS transmission 345 cannot be measured by UE 120 without risk of data loss because no measurement gap occurs during PRS transmission 345. Conventionally, when the PRS transmissions occur more frequently than measurement gaps, then a UE may not be able to effectively utilize PRS transmissions for location determination without risk of data loss. Further, as outlined above in relation to FIG. 3A, conventionally, even when measurement gaps are available, UE 120 may only make measurements during the 6 ms period of measurement gap 310 without risk of data loss. Thus, UE 120 may measure at most 6 PRS subframes during any 6 ms measurement gap 310 thereby limiting accuracy and inhibiting optimal utilization of UE location determination functionality.

Some disclosed techniques improve position determinations and permit the use of PRS signals for location determination in situations with dense PRS configurations and/or an increased frequency of PRS transmissions. In some embodiments, a UE may request dedicated gaps of a desired length. For example, the UE may request dedicated measurement gaps of a desired length from a base station such as an eNB. Upon receiving a response indicating confirmation of dedicated measurement gap configuration (e.g. from the eNB), the UE may utilize the dedicated measurement gaps to perform PRS measurements. The UE may perform the PRS measurements: (a) for a longer time (e.g. greater than 6 ms); and/or (b) more frequently (e.g. with a periodicity lower than 40 ms). In some embodiments, the UE may perform PRS measurements during the dedicated measurement gaps as indicated by the base station (e.g. eNB) in the response. For example, when the dedicated gaps conform to the dedicated measurement gaps requested by the UE, PRS measurements may be performed during those periods. In some embodiments, the UE request may specify that the dedicated measurement gaps are being requested for positioning purposes. In some embodiments, the dedicated gaps may be utilized by the UE for inter-frequency PRS measurements.

Disclosed embodiments also pertain to a base station (e.g. eNB), which may receive requests for dedicated gaps of a specified length from one or more UEs. In some embodiments, the UE requests may further specify that the dedicated gaps are being requested for positioning purposes. In some embodiments, the UE requests may specify that the dedicated gaps are being requested for inter-frequency PRS measurements. In some embodiments, the base station (e.g. eNB) may respond with a message indicating that the request for dedicated gaps has been accepted and/or that the dedicated gaps have been configured with a specified dedicated gap length and/or dedicated gap periodicity. In some embodiments, the base station (e.g. eNB) may respond with a message indicating that the request for dedicated gaps has been accepted and/or that the dedicated gaps have been configured with the requested length and/or requested periodicity.

Figure 4A:
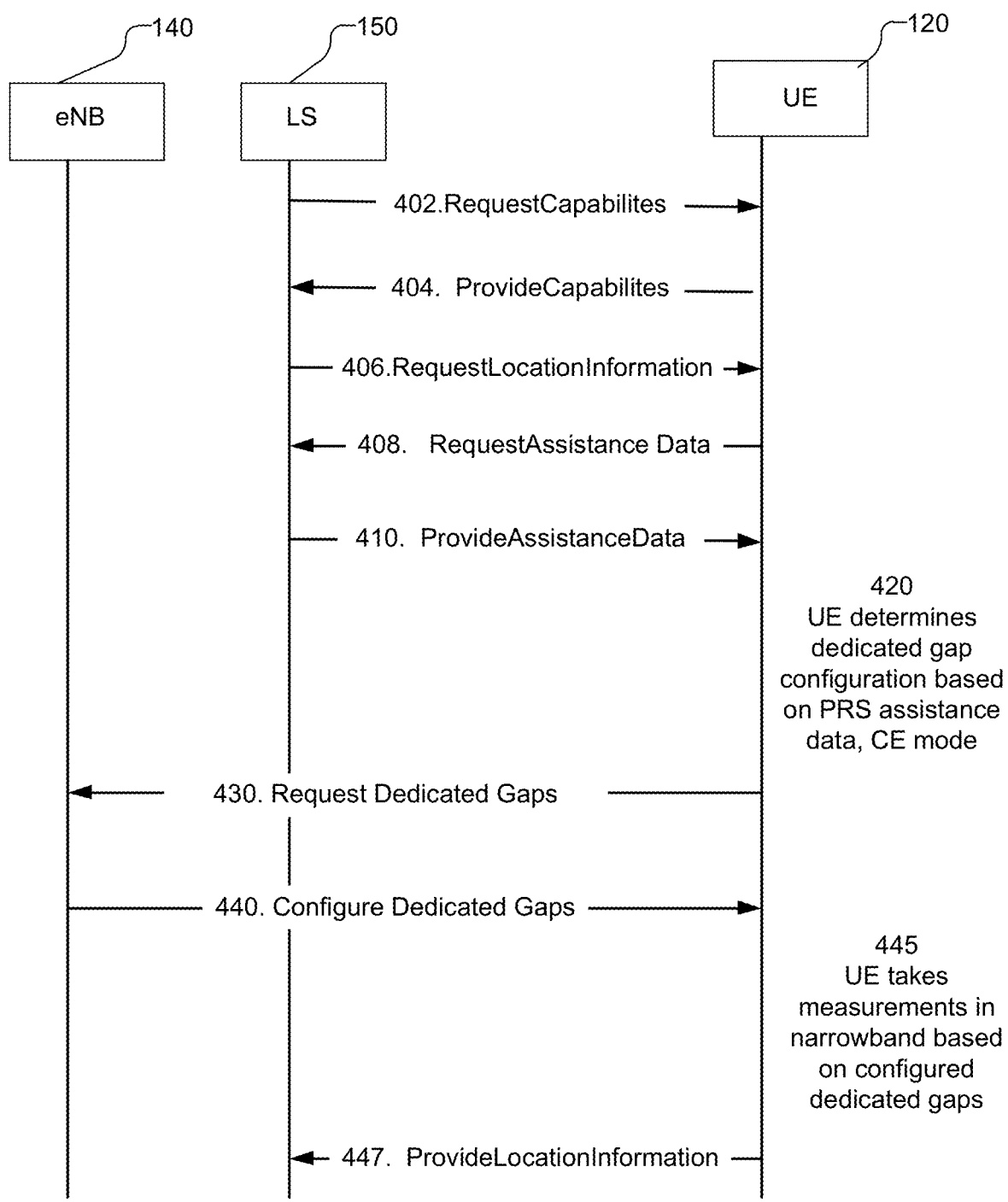
FIG. 4A and FIG. 4B show flow diagrams illustrating an exemplary message flow to facilitate location determination and dedicated gap configuration according to some disclosed embodiments.

FIG. 4A shows a flow diagram illustrating an exemplary message flow 400 to facilitate location determination and dedicated gap configuration according to some disclosed embodiments. As shown in FIG. 4A, portions of message flow 400 may be performed by UE 120, a base station 140, which may take the form of eNB 140, and LS 150, which may take the form of E-SMLC 155. In some embodiments, message flow 400 may occur using LPP/LPPe positioning protocol messages, but other types of messages may be used. In some embodiments, UE 120 may take the form of a BL UE, an eMTC UE and/or an FeMTC UE.

At 402, if the capabilities of UE 120 are not known to LS 150, then, in some embodiments, LS 150 may send a RequestCapabilities message to UE 120. The RequestCapabilities message may include, among other parameters, a request for positioning and/or OTDOA related capabilities of UE 120.

At 404, the UE 120 may respond with a ProvideCapabilities message sent to LS 150. In some embodiments, the ProvideCapabilities message at 404 may be provided by UE 120 unsolicited (e.g. without the RequestCapabilities message at 402). In some embodiments, the ProvideCapabilities message may be sent instead by UE 120 in association with a request for assistance data (e.g. at 408). The Provide Capabilities message may include, among other parameters, an indication of UE positioning and/or OTDOA related capabilities.

Flows similar to 402 and 404 but with message transfer in the opposite direction may be performed instead of 402 and 404 or in addition to 402 and 404 to transfer the capabilities of LS 150 to UE 120 in relation to support for positioning and/or OTDOA capabilities. These are not shown in FIG. 4A and, when used, may make use of a reversed LPP/LPPe mode whereby a UE 120 is enabled to request and receive capabilities from a LS 150.

In some embodiments, at 406, LS 150 may request location information from UE 120 in a RequestLocationInformation message. The request for location information may include a request for RSTD measurements to be performed by UE 120.

In some embodiments, at 408, UE 120 may request PRS assistance information including OTDOA assistance data from LS 150 in a RequestAssistanceData message in order to fulfill the request for location information received at 406. In some embodiments, UE 120 may specify the particular PRS assistance data or PRS assistance information requested. The terms PRS assistance data and PRS assistance information are used interchangeably herein. The PRS assistance data requested may include information about PRS configuration including the number of consecutive PRS subframes $N_{PRS}$ 338 transmitted by one or more base stations and/or the corresponding PRS periodicities $T_{PRS}$ 220, etc. In some embodiments, the message flow at 408 may not occur and the LS 150 may decide to send assistance data to UE 120 unsolicited (e.g. at 410).

At 410, LS 150 may send the assistance data to be transferred to UE 120 in a ProvideAssistanceData message. If 408 was performed, the assistance data may comprise all of the PRS assistance information requested by the UE 120 that may be available to LS 150. The PRS assistance data transferred at 410 may include the OTDOA assistance data specified in LPP/LPPe and may also include PRS configuration information for one or more base stations. In some embodiments, the PRS periodicity ($T_{PRS}$) associated with at least one cell related to the RSTD measurement request, or the number of subframes ($N_{PRS}$) in each PRS positioning occasion associated with at least one cell related to the RSTD measurement request may be provided as PRS assistance information. In some embodiments, message flow 400 may commence at 410, where LS 150 may send assistance data to UE 120 unsolicited and in conjunction with a RequestLocationInformation message.

In block 420, UE 120 may determine a desired dedicated gap configuration (e.g. for RSTD measurement) based on the assistance data (e.g. received in 410) and a current operating mode. The LTE standard specifies a "Coverage Enhanced" or "Enhanced Coverage" (hereinafter referred to collectively as "CE") operating mode for UEs 120. For example, a UE connected to a base station may move out of a region with acceptable signal quality into a region with sub-optimal signal quality (e.g. the reported signal quality has deteriorated beyond some threshold). To maintain communication session continuity and/or reliability, the UE may be reconfigured from a Normal Coverage ("NC") mode to CE mode. UEs 120 may also be configured to operate in CE mode based on one or more of: signaling, location, power, and/or cost considerations. The LTE standard specifies a plurality of CE modes (e.g. CE Mode A—for moderate coverage; and CE Mode B—for deep coverage). In CE mode, repetitions of some messages may be used to facilitate increased coverage. The number of message repetitions and other CE mode configuration parameters may have an impact on UE positioning operations. Thus, a current operating mode of UE 120—such as whether UE 120 is operating in CE mode and the CE mode sub-type (e.g. CE Mode A or CE Mode B)—may be used by UE 120 in addition to PRS configuration parameters to determine a desired dedicated gap configuration.

Accordingly, in block 420, UE 120 may determine a desired dedicated gap configuration based on the assistance data (e.g. PRS configuration parameters for a reference cell and/or one or more neighboring cells) and/or a current UE operating mode (CE mode—e.g. CE Mode A or CE Mode B—or NC mode). For example, UE 120 may determine a desired dedicated gap configuration based on one or more of: the PRS periodicity ($T_{PRS}$) for the serving cell and/or each neighbor cell, the number of subframes in each PRS positioning occasion ($N_{PRS}$) for each neighbor cell, the desired positioning accuracy, etc. The desired dedicated gap duration may be longer or shorter than the default 6 ms measurement gap and/or the desired dedicated gap periodicity may be more or less than the PRS periodicity of one or more of the reference/neighbor cells. In some embodiments, the desired dedicated gap configuration may be determined based (additionally or alternatively), in part, on the signal environment observed by UE 120 and/or a current operating mode. In some instances, the current operating mode of UE 120 may be indicative of the signal environment. In some embodiments, the desired dedicated gap configuration may be based (additionally or alternatively), in part, on one or more of: the number of frequency layers observed, signal strength, signal interference, etc. In some embodiments, desired dedicated gap configuration may be determined, in addition, based on the capabilities of UE 120. For example, the desired dedicated gap configuration may be determined by the extent to which dense PRS configuration is supported by UE 120 and/or the extent of support lower dedicated gap periodicities by UE 120.

At 430, UE may request a dedicated gap configuration by transmitting a request for dedicated gaps to eNB 140. The dedicated gaps may be requested as dedicated measurement gaps or as dedicated autonomous gaps. Thus, at 430, the dedicated gap may be either a (dedicated) "measurement gap" or a (dedicated) "autonomous gap." As outlined above, autonomous gaps refer to periods where UE 120 may suspend reception and transmission with the base station. In the description below, the terms "measurement" or "autonomous" may be used to identify the type of dedicated gap when appropriate. The requested measurement gaps (e.g. as requested at 430) may correspond to the desired measurement gaps (e.g. as determined in block 420). Thus, the terms "requested" and "desired" in relation to "dedicated gaps" are used interchangeably herein.

In one embodiment, at 430, the request may include configuration information related to the dedicated gaps including dedicated gap length and/or dedicated gap periodicity. In some embodiments, the dedicated gaps may be requested as dedicated RSTD measurement gaps. Once configured, during the dedicated gaps (e.g. dedicated RSTD measurement gaps), no DL control or data channel transmissions will be sent to the UE. Further, the UE will not monitor or process UL/DL data or control channel transmissions during the dedicated gaps (e.g. the dedicated RSTD measurement gaps).

In an alternative embodiment, at 430, the request for dedicated gaps may include configuration information for autonomous gaps. During autonomous gaps, the UE may potentially receive information on the LTE Physical Downlink Shared Channel (PDSCH). PDSCH is typically used to carry user data. In some embodiments, If PDSCH is scheduled during an autonomous gap period, then the UE may decode some threshold number of PDSCH symbols and may, based on the decoding, send acknowledgment (ACK) or no acknowledgment (NAK) signals to the serving eNB.

Conventionally, autonomous gaps may result in a loss of data in the event that the base station transmits data to the target device during the idle period created by the target device. Therefore, in some embodiments, in 430, in the request for dedicated gaps, UE 120 may inform the serving base station regarding its use of autonomous gaps to fulfill the measurement request from E-SMLC 155 or location LS 150. The qualifier "dedicated" when used with "autonomous gap" herein refers to a configuration of dedicated gaps as (dedicated) autonomous gaps (e.g. by eNB 140), which may occur in response to a request for dedicated gaps by UE 120 indicating the use of (dedicated) autonomous gaps for measurement purposes.

Consequently, in some embodiments (e.g. (a) upon configuration of dedicated gaps as dedicated autonomous gaps; and/or (b) in response to a request for dedicated gaps indicating the use of dedicated autonomous gaps for measurement purposes), eNB 140 may not schedule data for the device during the dedicated autonomous gap. In other embodiments, the data rate of any transmissions to UE 120 (e.g. by eNB 140) during the dedicated autonomous gap may be lowered thereby limiting any data loss. For example, the number of subframes lost during the dedicated autonomous gap may be relatively small so that the disruption may appear merely as a fading/channel error to the serving base station/eNB. Thus, with dedicated autonomous gaps, any Quality of Service (QoS) impact to Voice over Internet Protocol (VoIP), or Voice over LTE (VoLTE), or other services may be minimal.

In some embodiments, the request for dedicated gaps at 430 may include configuration information for the dedicated (measurement or autonomous) gaps such as, but not limited to, the length of the dedicated (measurement or autonomous) gap, the periodicity of the dedicated (measurement or autonomous) gap, the number of instances of the dedicated (measurement or autonomous) gap, etc. The requested dedicated (measurement or autonomous) gap configuration may be based on the length of a positioning occasion (e.g. 1, 2, 4, 6, 10, 20, 40, 80, or 160 subframes) and/or the periodicity of the positioning occasions (e.g. 10, 20, 40, 80, 160, 320, 640, or 1280 subframes), and/or the time for intra-frequency and/or inter-frequency tuning, etc.

In some embodiments, UE 120 may request a dedicated gap configuration with a dedicated measurement gap duration $G_{MN}$, where $6\ ms < G_{MN} \leq N_{PRS}$. In some embodiments, UE 120 may request a dedicated gap configuration with a dedicated measurement gap periodicity $G_{MP}$, where $T_{PRS} \leq G_{MP} \leq 80\ ms$, or $T_{PRS} \leq G_{MP} \leq 40\ ms$, as appropriate. The requested dedicated measurement gap periodicity may be longer or shorter than the default 40 ms or 80 ms measurement gap periodicity.

In some embodiments, UE 120 may request a dedicated gap configuration with a dedicated autonomous gap duration $G_{AN}$, where $6\ ms < G_{AN} \leq N_{PRS}$. In some embodiments, UE 120 may request a dedicated gap configuration with a dedicated autonomous gap periodicity $G_{AP}$, where $T_{PRS} \leq G_{AP} \leq 80\ ms$, or $T_{PRS} \leq G_{AP} \leq 40\ ms$, as appropriate.

At 440, eNB 140 may configure the dedicated gap and transmit a message indicating the dedicated gap configuration. For example, if a dedicated measurement gap was requested in 430, then, in 440, eNB 140 may configure the dedicated measurement gap and transmit a message indicating the dedicated measurement gap configuration. As another example, if a dedicated autonomous gap was requested in 430, then, in 440, eNB 140 may configure the dedicated autonomous gap and transmit a message indicating the dedicated autonomous gap configuration. For example, the serving base station/eNB 140 may send a confirmation to UE 120 that UE 120 may use dedicated autonomous gaps for measurement purposes. In some embodiments, the confirmation that dedicated autonomous gaps may be used by UE 120 may also include a time window during which dedicated autonomous gaps are allowed, and the maximum number subframes allowed for the dedicated autonomous gap.

The requested dedicated autonomous gap length or configured dedicated autonomous gap length may be longer or shorter than the default 6 ms measurement gap. The requested dedicated autonomous gap periodicity or the configured dedicated autonomous gap periodicity may be longer or shorter than the default 40 ms or 80 ms measurement gap period. In some instances, the actual dedicated (measurement or autonomous) gap configuration (by eNB 140) at 440 may be different from the requested (e.g. by UE 120) dedicated gap configuration at 430. For example, at 440, the dedicated gap configuration (e.g. configured by eNB 140) may be based on network conditions such as quality of service or other parameters and may differ, in some respects, from the requested dedicated gap configuration (e.g. as requested at 430 by UE 120). In some embodiments, the dedicated measurement gaps (e.g. requested by UE 120 and/or as configured by eNB 140) may be indicated in the form of a dedicated measurement gap pattern, which may indicate the periodicity and/or number of instances of the dedicated measurement gaps (as requested or configured).

In block 445, UE 120 may then measure RSTDs between a reference cell and multiple neighbor cells in the narrowband based on the received OTDOA assistance data and using the configured dedicated gaps. For example, in block 445, UE 120 may tune to the PRS narrowband (e.g. PRS narrowband 325) based on the configured dedicated (measurement or autonomous) gap (e.g. as configured in 440). In some embodiments, after tuning to the PRS narrowband, UE 120 may perform PRS and RSTD measurements. For example, if the length or duration of the configured dedicated (measurement or autonomous) gap is greater than 6 ms, UE 120 may be able to measure more than six PRS subframes. Further, if the dedicated (measurement or autonomous) gap periodicity is less than 40 ms (or 80 ms), then UE may be able to monitor additional PRS transmissions.

In some embodiments, if PDSCH is scheduled during a dedicated autonomous gap period, then the UE may decode some threshold number of PDSCH symbols and, based on the decoding, may send acknowledgment (ACK) or no acknowledgment (NAK) signals to the serving eNB. In some embodiments (e.g. (a) upon configuration of dedicated gaps as dedicated autonomous gaps (at 440), which may be sent in response to a request for dedicated gaps indicating the use of dedicated autonomous gaps for measurement purposes (at 430), eNB 140 may not schedule data for the device during the dedicated autonomous gap. In other embodiments, the data rate of any transmissions to UE 120 (e.g. by eNB 140) during the dedicated autonomous gap may be lowered thereby limiting any data loss. For example, the number of subframes lost during the dedicated autonomous gap may be relatively small so that the disruption may appear merely as a fading/channel error to the serving base station/eNB. Thus, with dedicated autonomous gaps, any Quality of Service (QoS) impact to Voice over Internet Protocol (VoIP), or Voice over LTE (VoLTE), or other services may be minimal. Accordingly, disclosed embodiments facilitate effective utilization of location determination functionality envisaged for eMTC/FeMTC UEs while decreasing the risk of data loss.

In some embodiments, during the dedicated measurement gaps, UE 120 may not transmit any data, and/or monitor (or be expected to monitor—e.g. by an eNB 140) transmissions from any primary cell or secondary cell (SCell), any primary SCell (PSCell). For example, UE 120 may not: (a) transmit any data, and/or (b) monitor (or be expected to monitor) transmissions (e.g. by an eNB 140) that overlap with dedicated measurement gaps on serving cells.

At 447, UE 120 may send ProvideLocationInformation message to LS 150 with the requested RSTD measurements. The ProvideLocationInformation message may include the RSTD measurements determined by UE 120 together with an identification of the measured cells. In some embodiments, LS 150 may use the received measurements to determine a location of UE 120. In some embodiments, UE 120 may use the RSTD measurements to determine its own location and possibly report the estimated location to LS 150. In some embodiments, LS 150 may then provide the determined location of UE 120 to LCS client 160 (not shown in FIG. 4A).

Figure 4B:
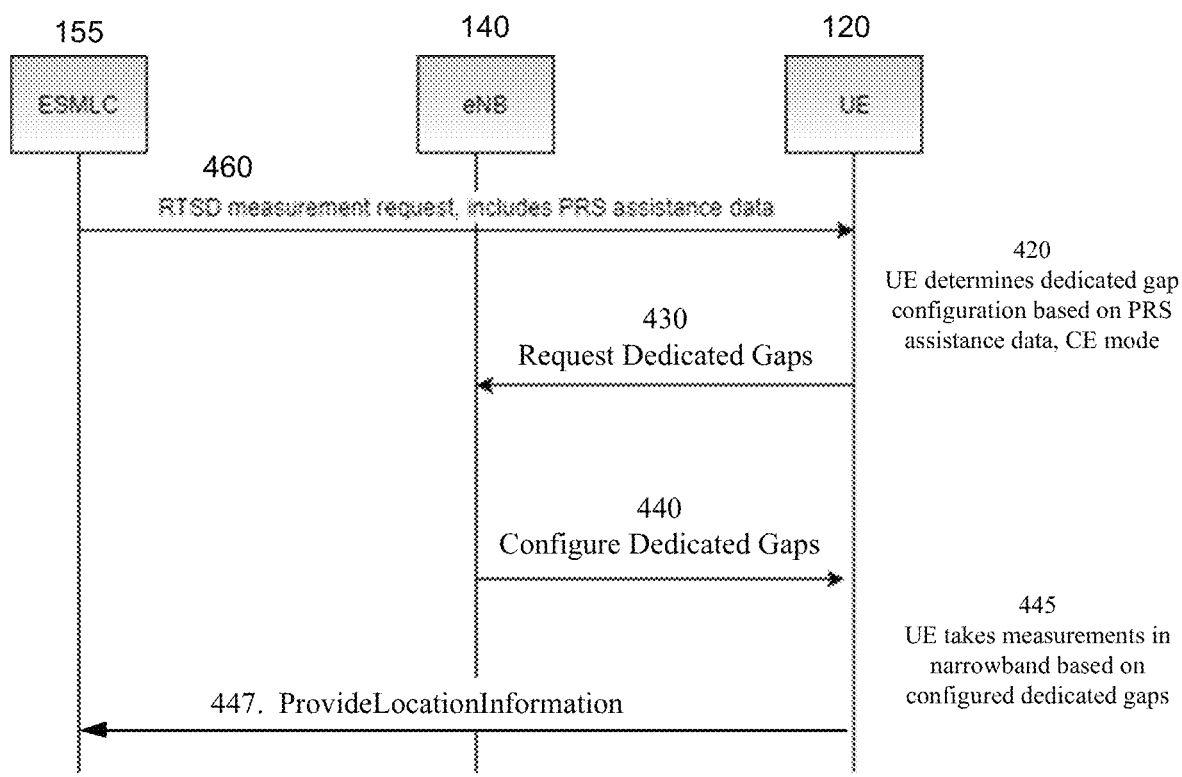

FIG. 4B shows a flow diagram illustrating another exemplary message flow 450 to facilitate location determination and dedicated gap configuration according to some disclosed embodiments. As shown in FIG. 4B, portions of message flow 450 may be performed by UE 120, a base station 140, which may take the form of eNB 140, and LS 150, which may take the form of E-SMLC 155. In some embodiments, message flow 400 may occur using LPP/LPPe positioning protocol messages, but other types of messages may be used. In some embodiments, UE 120 may take the form of a BL UE, an eMTC UE and/or an FeMTC UE.

In FIG. 4B, at 460, UE 120 may receive a location determination or RSTD measurement request. In some embodiments, the measurement request may include PRS assistance data, including OTDOA assistance data. In some embodiments, the PRS periodicity ($T_{PRS}$) associated with at least one cell related to the RSTD measurement request, or the number of subframes ($N_{PRS}$) in each PRS positioning occasion associated with at least one cell related to the RSTD measurement request may be provided as PRS assistance information. In some embodiments, UE 120 may separately request PRS assistance data including OTDOA assistance data following reception of RSTD measurement request at 410 and E-SMLC 155 may respond to the PRS assistance data request by transmitting the PRS assistance data, which may include OTDOA assistance data.

In FIG. 4B, the functionality provided by blocks 420 and 445 and the message flows at 430, 440 and 447 correspond to those described above in relation to FIG. 4A.

In some embodiments, UE 120 (e.g. an eMTC/Category M1 UE and/or an FeMTC/Category M2 UE) may perform PRS and/or RSTD measurements for at least one cell with a dense PRS configuration (e.g. $N_{PRS}$>6) using dedicated gaps, which may be configured using blocks 402 through 445 (FIG. 4A), or 420 through 445 (FIG. 4B) above. In some embodiments, the dedicated gap pattern (e.g. configured in 440) may use one of the patterns specified in the table below.

Some Dedicated Gap Pattern Configurations
(e.g. supported by UE 120)

| Dedicated Gap Length (ms) | Dedicated Gap Repetition Period (ms) |
| --- | --- |
| 10 | 80 |
| 10 | 160 |
| 10 | 320 |
| 10 | 640 |
| 10 | 1280 |
| 14 | 160 |
| 14 | 320 |
| 14 | 640 |
| 14 | 1280 |
| 24 | 320 |
| 24 | 640 |
| 24 | 1280 |
| 32 | 320 |
| 32 | 640 |
| 32 | 1280 |
| 54 | 640 |
| 54 | 1280 |
| 64 | 640 |
| 64 | 1280 |
| 80 | 640 |
| 80 | 1280 |

In the table above, the first column shows some possible values of the dedicated gap lengths in milliseconds, while the second column shows some values of corresponding repetition periods or dedicated gap periodicities in milliseconds. In some embodiments, each dedicated gap pattern may be specified and/or identified using a unique dedicated (measurement) gap identifier. In some embodiments, UE 120 may be configured to request (e.g. requested in 430) a dedicated gap pattern and/or dedicated gap configuration based on the unique dedicated gap identifier. In some embodiments, UE 120 may be configured to identify and/or update its configuration based on the unique dedicated gap identifier (e.g. received in 440).

Figure 5:
FIG. 5 shows a flowchart of an exemplary method for dedicated gap configuration.

FIG. 5 shows a flowchart of an exemplary method 500 for dedicated gap configuration. In some embodiments, method 500 may be performed by a base station such as eNB 140. In some embodiments, method 500 may be performed by eNBs in a wireless network that supports, or may be configured to support, LTE and/or LTE-M.

In block 510, eNB 140 may receive, from a UE, a dedicated gap request for performing RSTD measurements, the dedicated gap request comprising a desired configuration of dedicated gaps.

The gap request may include configuration information for the desired dedicated gaps such as, but not limited to, the length of the dedicated gap, the periodicity of the dedicated gap, the number of instances of the desired dedicated gap, etc. The desired dedicated gap configuration may be based on the length of a positioning occasion (e.g. 1, 2, 4, 6, 10, 20, 40, 80, or 160 subframes) of one or more base stations associated with the network and/or the periodicity of the positioning occasions (e.g. 10, 20, 40, 80, 160, 320, 640, or 1280 subframes) of one or more base stations associated with the network. The desired dedicated gap duration may be longer or shorter than the default 6 ms measurement gap and the desired dedicated gap periodicity may be longer or shorter than the default 40 ms or 80 ms measurement gap.

In some embodiments, the dedicated gap request may comprise a request for dedicated measurement gaps and/or dedicated autonomous gaps. In some embodiments, when the dedicated gap request comprises a request for dedicated autonomous gaps, the dedicated gap request may indicate that the dedicated autonomous gaps are being requested for RSTD measurement purposes.

In block 520, eNB 140 may respond to the dedicated gap request, wherein the response comprises a dedicated gap configuration. In some embodiments, the dedicated gap configuration may be based on one or more of: a Quality of Service (QoS) parameter, or a performance parameter. In some embodiments, the dedicated gap configuration may comprise one or more of: the length of the configured gap, or the periodicity of the configured gap, or the number of instances of the configured gap.

In some embodiments, eNB 140 may respond (e.g. in block 520) to the dedicated gap request by configuring dedicated gaps based on the request for dedicated gaps (e.g. received in block 510). For example, in some embodiments, eNB 140 may respond to the dedicated gap request by configuring dedicated gaps as requested by the UE. In some embodiments, the configuration of dedicated gaps by eNB 140 may be based on the request for dedicated gaps, but differ, in some respects, from the dedicated gap configuration request (e.g. received in block 510). For example, eNB 140 may configure the dedicated gaps based, in part, on system or network parameters such as, but not limited to, quality of service, performance, etc.

The response transmitted to the UE (e.g. in block 520) may include configuration information for the configured dedicated gaps such as, but not limited to, the length of the configured dedicated gap, the periodicity of the configured dedicated gap, the number of instances of the configured dedicated gap, etc. The configured dedicated gap duration may be longer or shorter than the default 6 ms measurement gap and the configured dedicated gap periodicity may be longer or shorter than the default 40 ms or 80 ms measurement gap.

In some embodiments, when the request for dedicated gaps (e.g. received in block 510) indicates the use of dedicated autonomous gaps for measurement purposes, eNB 140 may not schedule data for the device during the dedicated autonomous gap periods (e.g. as configured in block 520).

In some embodiments, the data rate of any transmissions by eNB 140 to UE 120 during the dedicated autonomous gap periods (e.g. as configured in block 520) may be lowered thereby limiting any data loss. For example, the data rate may be lowered so that the number of subframes lost during the dedicated autonomous gap period (e.g. as configured in block 520) may be relatively small so that the disruption may appear merely as a fading/channel error to the eNB. In some embodiments, the data rate may be lowered during the dedicated autonomous gaps (e.g. as configured in block 520) while maintaining the QoS parameters. In some embodiments, the data rate may be lowered during the dedicated autonomous gaps (e.g. as configured in block 520) so that any Quality of Service (QoS) impact to Voice over Internet Protocol (VoIP), or Voice over LTE (VoLTE), or other services may be decreased or minimal or may not be noticeable to users.

Figure 6:
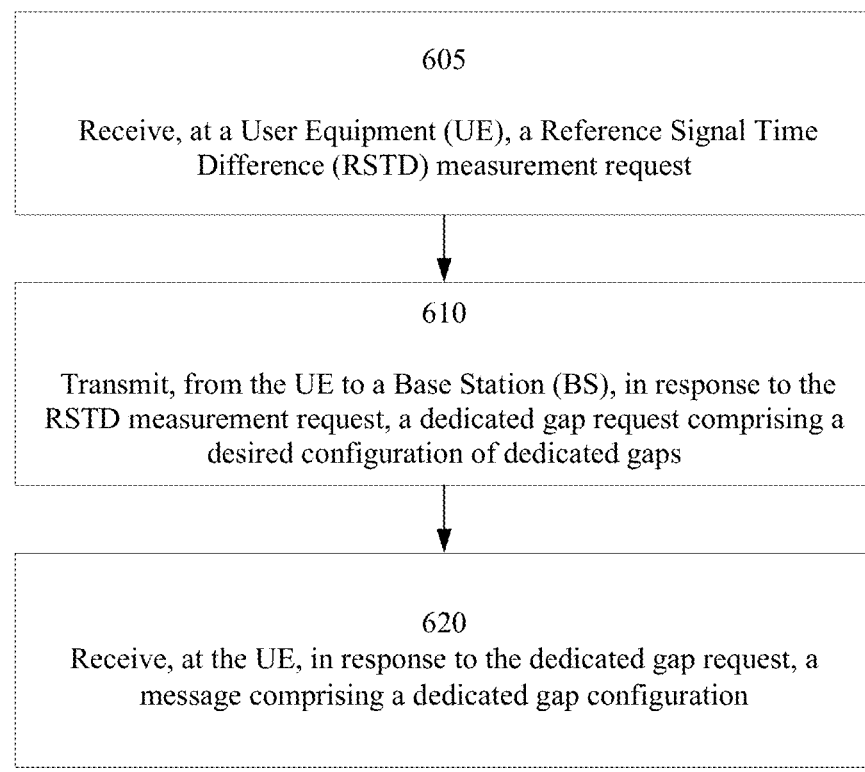
FIG. 6 shows a flowchart of an exemplary method for dedicated gap configuration.

FIG. 6 shows a flowchart of an exemplary method 600 for dedicated gap configuration. In some embodiments, method 600 may be performed by a UE 120, which may take the form of a BL UE, eMTC UE, or an FeMTC UE. In some embodiments, method 600 may be performed by a UE 120 in a wireless network that supports LTE/LTE-M and includes eMTC/FeMTC devices.

In block 605, UE 120 may receive a Reference Signal Time Difference (RSTD) measurement request. For example, the RSTD request may be received from LS 150 or E-SMLC 155. In some embodiments, the RSTD measurement request may comprise PRS assistance information. In some embodiments, the PRS periodicity ($T_{PRS}$) associated with at least one cell related to the RSTD measurement request, or the number of subframes ($N_{PRS}$) in each PRS positioning occasion associated with at least one cell related to the RSTD measurement request may be provided as PRS assistance information. In some embodiments, the PRS assistance data may be requested from and/or received by UE 120 from LS 150 or E-SMLC 155. For example, in some embodiments, UE 120 may request PRS assistance data following reception (e.g. in block 605) of RSTD measurement request from E-SMLC 155. In some embodiments, the PRS assistance data may be received unsolicited by UE 120 from LS 150 or E-SMLC 155, For example, in some embodiments, the PRS assistance data may be received (e.g. in block 605) along with the RSTD measurement request from E-SMLC 155.

In block 610, UE 120 may transmit, in response to the RSTD measurement request, a dedicated gap request comprising a desired configuration of dedicated gaps. In some embodiments, the dedicated gap request may comprise a request for dedicated measurement gaps, and/or a request for dedicated autonomous gaps. In some embodiments, the dedicated gap request may be transmitted to a base station such as eNB 140. In some embodiments, the dedicated gap request may be transmitted to an eNB 140 serving UE 120.

In some embodiments, the RSTD measurement request may comprise positioning reference signal (PRS) assistance information and the dedicated gap request comprising the request for dedicated measurement gaps may be further transmitted in response to at least one of: (a) a determination that the RSTD measurement request involves a plurality of carrier frequencies, or (b) a determination that the RSTD measurement request involves one or more inter-frequency measurements by the UE, or (c) a determination that the RSTD measurement request involves one or more intra-frequency measurements by the UE; or (d) a determination that an estimated time to perform at least one RSTD measurement specified in the RSTD measurement request exceeds a default Long Term Evolution (LTE) measurement gap duration, or (e) a determination that a default LTE measurement gap periodicity exceeds at least one PRS periodicity ($T_{PRS}$) associated with the RSTD measurement request, or (f) a determination that a number of subframes ($N_{PRS}$) in at least one PRS positioning occasion related to the RSTD measurement request exceeds a threshold, or some combination of (a) through (e). In some embodiments, the determinations in one or more of (a) through (e) above may be based, in part, on the PRS assistance information (e.g. received by UE 120).

In some embodiments, the RSTD measurement request may comprise positioning reference signal (PRS) assistance information and the dedicated gap request comprising the request for dedicated autonomous gaps may be further transmitted in response to at least one of: (g) a determination that the RSTD measurement request involves a plurality of carrier frequencies, or (h) a determination that the RSTD measurement request involves one or more inter-frequency measurements by the UE, or (i) a determination that the RSTD measurement request involves one or more intra-frequency measurements by the UE; or (j) a determination that an estimated time to perform at least one RSTD measurement specified in the RSTD measurement request exceeds a default Long Term Evolution (LTE) autonomous gap duration, or (k) a determination that a default LTE autonomous gap periodicity exceeds at least one PRS periodicity ($T_{PRS}$) associated with the RSTD measurement request, or (l) a determination that a number of subframes ($N_{PRS}$) in at least one PRS positioning occasion related to the RSTD measurement request exceeds a threshold, or some combination of (g) through (l) above. In some embodiments, the determinations in one or more of (g) through (l) above may be based, in part, on the PRS assistance information (e.g. received by UE 120).

In some embodiments, the desired configuration of dedicated gaps (e.g. in block 610) may be determined based on the assistance data (e.g. PRS configuration parameters for a reference cell and/or one or more neighboring cells) and/or a current UE operating mode (CE mode—e.g. CE Mode A or CE Mode B—or NC mode). In some embodiments, the desired configuration of dedicated gaps (e.g. requested in block 610) may be based, at least in part, on one or more of: UE operating mode, a PRS periodicity ($T_{PRS}$) associated with at least one cell related to the RSTD measurement request; or a number of subframes ($N_{PRS}$) in each PRS positioning occasion associated with at least one cell related to the RSTD measurement request; or a desired positioning accuracy; or some combination thereof. For example, UE 120 may determine and transmit a dedicated gap request (e.g. in block 610) based on one or more of: the PRS periodicity ($T_{PRS}$) for the serving cell and/or each neighbor cell, the number of subframes in each PRS positioning occasion ($N_{PRS}$) for the reference cell and/or each neighbor cell, the desired positioning accuracy, etc. The requested dedicated gap (e.g. in block 610) may be longer or shorter than the default 6 ms measurement gap.

In some embodiments, the desired configuration of dedicated gaps may be determined based (additionally or alternatively), in part, on the signal environment observed by UE 120. For example, the number of frequency layers observed, signal strength, signal interference, etc. In some embodiments, UE 120 may transmit the dedicated gap request (e.g. in block 610) in response to a determination that the requested RSTD measurements involve a plurality of carrier frequencies. As another example, UE 120 may transmit the dedicated gap request (e.g. in block 610) in response to a determination that the RSTD or PRS measurements involve a plurality of frequency layers (intra-frequency and/or inter-frequency).

In some embodiments, the desired configuration of dedicated gaps (e.g. requested in block 610) may be based, in addition, on the capabilities of UE 120. For example, the extent to which dense PRS configuration is supported by UE 120 and/or the extent of support for lower measurement gap periodicities. by UE 120 may be used, at least in part, to determine the desired configuration of dedicated gaps.

In some embodiments, the dedicated gap request (e.g. in block 610) may include configuration information for the desired configuration of dedicated gaps such as, but not limited to, the length of the requested dedicated gap, the periodicity of the requested dedicated gap, the number of instances of the requested dedicated gap, etc. The desired configuration of dedicated gaps (e.g. requested in block 610) may be determined based on the length of a positioning occasion (e.g. 1, 2, 4, 6, 10, 20, 40, 80, or 160 subframes) and/or the periodicity of the positioning occasions (e.g. 10, 20, 40, 80, 160, 320, 640, or 1280 subframes), and/or the time for intra-frequency and/or inter-frequency tuning, etc. In some embodiments, the dedicated gap request (e.g. in block 610) may comprise a desired dedicated gap duration $G_N$, where 6 ms<$G_N$≤$N_{PRS}$. In some embodiments, the dedicated gap request (e.g. in block 610) may comprise a desired dedicated gap periodicity $G_P$, where $T_{PRS}$≤$G_P$≤80 ms, or $T_{PRS}$≤$G_P$≤40 ms, as appropriate. In some embodiments, the desired dedicated gap duration and/or desired dedicated gap periodicity may differ from the default conventional measurement gap duration and the default conventional measurement gap periodicity, respectively.

In some embodiments, when the dedicated gap request (e.g. in block 610) includes a request for dedicated measurement gaps, UE 120 may request a desired configuration of dedicated gaps with: (a) a dedicated measurement gap duration $G_{MN}$, where 6 ms<$G_{MN}$≤$N_{PRS}$; and/or (b) a dedicated measurement gap periodicity $G_{MP}$, where $T_{PRS}$≤$G_{MP}$≤80 ms, or $T_{PRS}$≤$G_{MP}$≤40 ms, as appropriate. In some embodiments, when the dedicated gap configuration request (e.g. in block 610) includes a request for dedicated autonomous gaps, UE 120 may request a desired configuration of dedicated gaps with: (i) a dedicated autonomous gap duration $G_{AN}$, where 6 ms<$G_{AN}$≤$N_{PRS}$; and/or (ii) dedicated autonomous gap periodicity $G_{AP}$, where $T_{PRS}$≤$G_{AP}$≤80 ms, or $T_{PRS}$≤$G_{AP}$≤40 ms, as appropriate.

In block 620, UE 120 may receive, in response to the dedicated gap request, a message comprising a dedicated gap configuration. The dedicated gap configuration (e.g. received in block 620) may be based, in part, on the dedicated gap request (e.g. sent in block 610). In some embodiments, dedicated gap configuration (e.g. received in block 620) may indicate that the dedicated gaps were configured as requested by the UE. In some embodiments, dedicated gap configuration (e.g. received in block 620) may be based on the dedicated gap request (e.g. sent in block 610), but differ, in some respects from the desired configuration of dedicated gaps (e.g. as requested in block 610). For example, the dedicated gaps may be configured based, in part, on system or network parameters such as, but not limited to, quality of service, performance, etc. The response may include configuration information for the configured dedicated gaps such as, but not limited to, the length of the configured dedicated gap, the periodicity of the configured dedicated gap, the number of instances of the configured dedicated gap, etc. In some embodiments, the configured dedicated gap duration may differ from the default 6 ms measurement gap and the configured dedicated gap periodicity may differ from the default 40 ms or 80 ms measurement gap periodicty.

FIG. 7 shows a flowchart of an exemplary method 700 for measurement gap configuration. In some embodiments, method 700 may be performed by a base station such as eNB 140. In some embodiments, method 700 may be performed by eNBs in a wireless network that supports LTE and/or LTE-M.

In block 710, eNB 140 may receive, from UE 120, a dedicated autonomous gap request for performing RSTD measurements, where the dedicated autonomous gap request may comprise a desired configuration of dedicated autonomous gaps. In some embodiments, the dedicated autonomous gap request may comprise an indication that the dedicated autonomous gaps are being requested for RSTD measurement purposes.

In some embodiments, the dedicated autonomous gap request (e.g. received in block 710) may include configuration information for the desired dedicated autonomous gaps such as, but not limited to, the length of the dedicated autonomous gap, the periodicity of the dedicated autonomous gap, the number of instances of the desired dedicated autonomous gap, etc. The desired dedicated autonomous gap configuration may be based on the length of a positioning occasion (e.g. 1, 2, 4, 6, 10, 20, 40, 80, or 160 subframes) of one or more base stations associated with the network and/or the periodicity of the positioning occasions (e.g. 10, 20, 40, 80, 160, 320, 640, or 1280 subframes) of one or more base stations associated with the network. The desired dedicated autonomous gap duration may differ from the default 6 ms measurement gap and the desired dedicated gap periodicity may differ from a default 40 ms or 80 ms measurement gap.

In block 720, eNB 140 may respond to the dedicated autonomous gap request, wherein the response comprises a dedicated autonomous gap configuration. In some embodiments, the dedicated autonomous gap configuration may be based on one or more of: a Quality of Service (QoS) parameter, or a performance parameter. In some embodiments, the dedicated autonomous gap configuration may comprise one or more of: the length of the configured dedicated autonomous gap, or the periodicity of the configured dedicated autonomous gap, or the number of instances of the configured dedicated autonomous gap.

In some embodiments, eNB 140 may respond (e.g. in block 720) to the dedicated autonomous gap request by configuring dedicated autonomous gaps based on the request for dedicated autonomous gaps (e.g. received in block 710). For example, in some embodiments, eNB 140 may respond to the dedicated autonomous gap request by configuring dedicated autonomous gaps as requested by the UE 120. In some embodiments, the configuration of dedicated autonomous gaps by eNB 140 (in block 720) may be based on the request for dedicated autonomous gaps (in block 710), but differ, in some respects, from the dedicated gap configuration request (e.g. received in block 710). For example, eNB 140 may configure the dedicated autonomous gaps based, in part, on system or network parameters such as, but not limited to, QoS, performance, etc.

The response transmitted to the UE (e.g. in block 720) may include configuration information for the configured dedicated autonomous gaps such as, but not limited to, the length of the configured dedicated autonomous gaps, the periodicity of the configured dedicated autonomous gaps, the number of instances of the configured dedicated autonomous gaps, etc. The configured dedicated autonomous gap duration may differ from the default 6 ms measurement gap and the configured measurement gap periodicity may differ from a default 40 ms or 80 ms measurement gap.

In block 730, eNB 140 may not schedule data for UE 120 during the dedicated autonomous gap periods (e.g. as configured in block 720). For example, when the request for dedicated gaps (e.g. received in block 710) indicates the use of autonomous gaps for measurement purposes, eNB 140 may not schedule data for the UE 120 during the dedicated autonomous gap periods (e.g. as configured in block 720).

Alternatively, in block 730, the data rate of any transmissions by eNB 140 to UE 120 during the dedicated autonomous gap periods (e.g. as configured in block 720) may be lowered thereby limiting any data loss. For example, the data rate may be lowered so that the number of subframes lost during the dedicated autonomous gap period (e.g. as configured in block 720) may be relatively small so that the disruption may appear merely as a fading/channel error to the eNB. In some embodiments, the data rate may be lowered during the dedicated autonomous gaps (e.g. as configured in block 720) while continuing to maintain specified QoS parameters. In some embodiments, the data rate may be lowered during the dedicated autonomous gaps (e.g. as configured in block 720) so that any QoS impact to Voice over Internet Protocol (VoIP), or Voice over LTE (VoLTE), or other services may be decreased or minimal or not noticeable to users.

Figure 8:
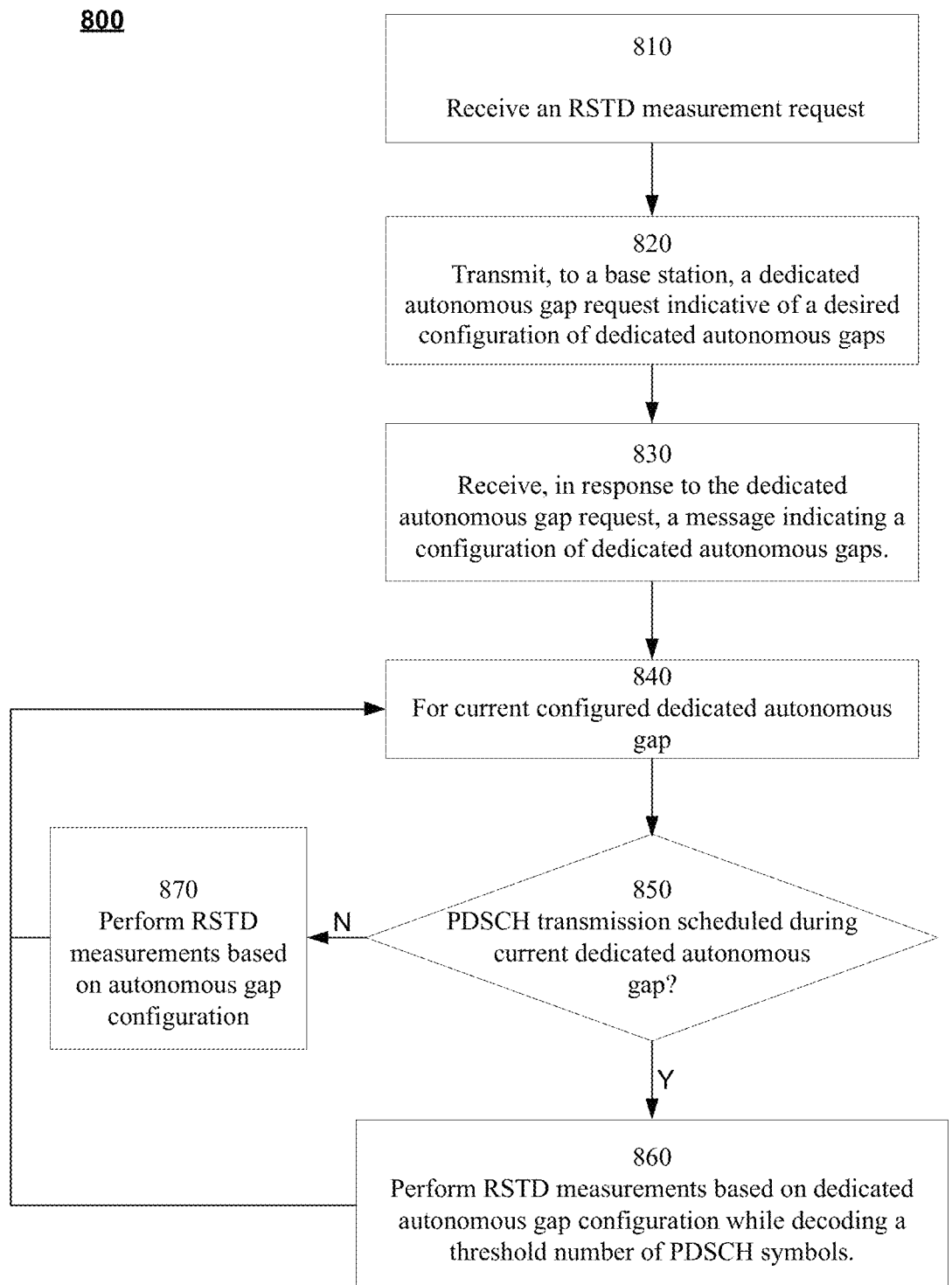
FIG. 8 shows a flowchart of an exemplary method for dedicated gap configuration.

FIG. 8 shows a flowchart of an exemplary method 800 for dedicated gap configuration. In some embodiments, method 800 may be performed by a UE 120, which may take the form of a BL UE, eMTC UE, or an FeMTC UE. In some embodiments, method 800 may be performed by a UE 120 in a wireless network that supports LTE/LTE-M and includes eMTC/FeMTC devices.

In block 810, UE may receive a Reference Signal Time Difference (RSTD) measurement request. For example, the RSTD request may be received from LS 150 or E-SMLC 155. In some embodiments, the RSTD measurement request may comprise PRS assistance information.

In block 820, the UE may transmit, in response to the RSTD measurement request, a dedicated autonomous gap request comprising a desired configuration of dedicated autonomous gaps. In some embodiments, the dedicated autonomous gap request may be transmitted to a base station such as eNB 140. In some embodiments, the dedicated autonomous gap request may be transmitted to an eNB 140 serving UE 120.

In some embodiments, the desired configuration of dedicated autonomous gaps (e.g. requested in block 820) may be determined based on the PRS assistance data (e.g. PRS configuration parameters for a reference cell and/or one or more neighboring cells) and/or a current UE operating mode (CE mode—e.g. CE Mode A or CE Mode B—or NC mode). In some embodiments, the desired configuration of dedicated autonomous gaps (e.g. requested in block 820) may be based, at least in part, on one or more of: UE operating mode, a PRS periodicity ($T_{PRS}$) associated with at least one cell related to the RSTD measurement request; or a number of subframes ($N_{PRS}$) in each PRS positioning occasion associated with at least one cell related to the RSTD measurement request; or a desired positioning accuracy; or some combination thereof. For example, UE 120 may determine and transmit a dedicated autonomous gap request (e.g. in block 820) based on one or more of: the PRS periodicity ($T_{PRS}$) for the serving cell and/or each neighbor cell, the number of subframes in each PRS positioning occasion ($N_{PRS}$) for the reference cell and/or each neighbor cell, the desired positioning accuracy, etc.

In some embodiments, the desired configuration of dedicated autonomous gaps may be determined based (additionally or alternatively), in part, on the signal environment observed by UE 120. For example, the number of frequency layers observed, signal strength, signal interference, etc. In some embodiments, UE 120 may transmit the dedicated autonomous gap request (e.g. in block 820) in response to a determination that the requested RSTD measurements involve a plurality of carrier frequencies. As another example, UE 120 may transmit the dedicated autonomous gap request (e.g. in block 820) in response to a determination that the RSTD or PRS measurements involve a plurality of frequency layers (intra-frequency and/or inter-frequency).

In some embodiments, the desired configuration of dedicated autonomous gaps (e.g. requested in block 820) may be based, in addition, on the capabilities of UE 120. For example, the extent to which dense PRS configuration is supported by UE 120 and/or the extent of support for lower measurement gap periodicities. by UE 120 may be used, at least in part, to determine the desired configuration of dedicated autonomous gaps.

In some embodiments, the dedicated autonomous gap request (e.g. in block 820) may include configuration information for the desired configuration of dedicated autonomous gaps such as, but not limited to, the length of the requested dedicated autonomous gap, the periodicity of the requested dedicated autonomous gap, the number of instances of the requested dedicated autonomous gap, etc. The desired configuration of dedicated autonomous gaps (e.g. requested in block 820) may be determined based on the length of a positioning occasion (e.g. 1, 2, 4, 6, 10, 20, 40, 80, or 160 subframes) and/or the periodicity of the positioning occasions (e.g. 10, 20, 40, 80, 160, 320, 640, or 1280 subframes), and/or the time for intra-frequency and/or inter-frequency tuning, etc. In some embodiments, UE 120 may request a desired configuration of dedicated gaps with: (i) a dedicated autonomous gap duration $G_{AN}$, where 6 ms<$G_{AN}$≤$N_{PRS}$; and/or (ii) dedicated autonomous gap periodicity $G_{AP}$, where $T_{PRS}$≤$G_{AP}$≤80 ms, or $T_{PRS}$≤$G_{AP}$≤40 ms, as appropriate.

In block 830, UE 120 may receive, in response to the request in block 820, a message indicating a configuration of dedicated autonomous gaps. For example, in block 830, UE 120 may receive a message indicating that the configuration of dedicated autonomous gaps corresponds to the requested configuration of dedicated autonomous gaps (e.g. as requested in block 820). In some embodiments, the configuration of dedicated autonomous gaps (e.g. received in block 830) may be based on the request for dedicated autonomous gaps (in block 820), but differ, in some respects, from the dedicated gap configuration request (e.g. in block 820). For example, the dedicated autonomous gaps may be configured based, in part, on system or network parameters such as, but not limited to, QoS, performance, etc.

The response received by UE 120 (e.g. in block 830) may include configuration information for the configured dedicated autonomous gaps such as, but not limited to, the length of the configured dedicated autonomous gaps, the periodicity of the configured dedicated autonomous gaps, the number of instances of the configured dedicated autonomous gaps, etc. The configured dedicated autonomous gap duration may differ from the default 6 ms measurement gap and the configured dedicated autonomous gap periodicity may differ from a default 40 ms or 80 ms measurement gap.

In block 840, UE 120 may consider a current (first or next) dedicated autonomous gap. In block 850, UE 120 may determine if PDSCH transmissions are scheduled during a current (first or next) dedicated autonomous gap.

If no PDSCH transmissions are scheduled during a current (first or next) autonomous gap ("N" in block 850), then, in block 870, RSTD measurements may be performed based on the dedicated autonomous gap configuration in block 830.

If PDSCH transmissions are scheduled during a current (first or next) autonomous gap ("Y" in block 850), then, in block 860, RSTD measurements may be performed based on the dedicated autonomous gap configuration (e.g. as configured in step 830). In addition, in block 860, decode a threshold number of PDSCH symbols. Further, in some embodiments, based on the decoding, UE 120 may send ACK/NAK signals to serving eNB 140. Another iteration may then commence in block 840.

Figure 9:
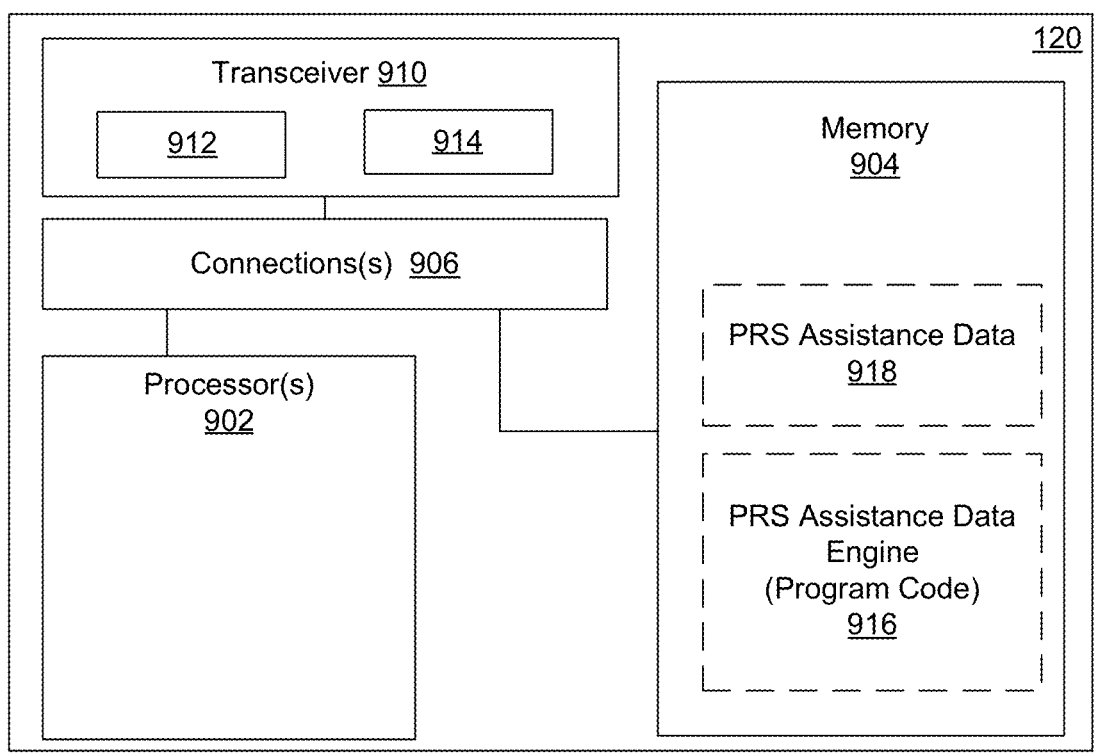
FIG. 9 shows a schematic block diagram illustrating certain exemplary features of a UE.

FIG. 9 shows a schematic block diagram illustrating certain exemplary features of UE 120. In some embodiments, UE 120 and/or processor(s) 902 may perform, or be configured to perform, the UE portion of message flows 400 and/or 450, and methods 600 and/or 800. Further, UE 120 and/or processor(s) 902 may be enabled to request dedicated gap configuration, process dedicated gap configuration responses, and perform RSTD/OTDOA measurement using PRS assistance data 918. UE 120 may take the form of a BL UE, eMTC UE, or FeMTC UE.

UE 120 may, for example, include one or more processor(s) 902, memory 904, a transceiver 910 (e.g., wireless network interface), which may be operatively coupled with one or more connections 906 (e.g., buses, lines, fibers, links, etc.) to memory 904. In certain example implementations, all or part of UE 120 may take the form of a chipset, and/or the like. Transceiver 910 may, for example, include a transmitter 912 enabled to transmit one or more signals over one or more types of wireless communication networks and a receiver 914 to receive one or more signals transmitted over the one or more types of wireless communication networks.

Processor(s) 902 may be implemented using a combination of hardware, firmware, and software. For example, processor(s) 902 may perform disclosed functions by reading and executing program code such as UE PRS Assistance Data Engine 916, which may use data such as PRS assistance data 918. In some embodiments, program code for UE PRS Assistance Data Engine 916, may reside in memory 904 along with PRS assistance data 918. The program code for PRS Assistance Data Engine 916 may be retrieved from memory 904 and executed by processor(s) 902. PRS assistance data 918 may include OTDOA assistance information (including information for non-serving cells). UE 120 and/or processor(s) 902 may perform portions of message flows 400 and/or 450 and methods 600 and/or 800. For example, processor(s0 902 may retrieve and process PRS assistance data 918 comprising OTDOA assistance information for a reference cell and/or neighbor cells, etc. in part by executing code for UE PRS Assistance Data Engine 916. UE 120 and/or processor(s) 902 may be configured to generate requests for dedicated gaps, including dedicated measurement gaps or dedicated autonomous gaps; process configuration messages received from base stations/eNB 140; and/or configure dedicated gaps (measurement or autonomous) based on the configuration messages.

In some embodiments, UE 120 may include one or more UE antennas (not shown) which may be internal or external. UE antennas may be used to receive and/or transmit signals, which may processed by transceiver 910. In some embodiments, UE 120 may measure times of arrival of received signals and perform OTDOA/RSTD measurements and the raw measurements may be processed by processor(s) 902. In some embodiments, UE 120 may determine its location based on the RSTD measurements; or may send the RSTD measurements to LS 150 or E-SMLC 155, which may determine the location of UE 120 based on the RSTD measurements.

The methodologies described herein may be implemented by various means depending upon the application. For example, these methodologies may be implemented in hardware, firmware, software, or any combination thereof. For a hardware implementation, the processor(s) 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software code may be stored in a computer-readable medium, which may form part of memory 904. The program code (e.g. UE PRS assistance data engine 916) may be read and executed by processor(s) 902. Memory may be implemented within the processor unit or external to the processor(s) 902. As used herein, the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code (e.g. UE PRS assistance data engine 916) on a computer-readable medium, which may form part of memory 904. For example, memory 904 may include program code such as UE PRS assistance data engine 916: to generate desired dedicated (measurement or autonomous) gap requests and/or to process configured dedicated (measurement or autonomous) gap responses; and/or to support OTDOA/RSTD measurement using PRS assistance data 918, and/or to facilitate UE position determination, and support for LPP/LPPe and other protocols.

Computer-readable media may include physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Memory 904 may represent any data storage mechanism. Memory 904 may include, for example, a primary memory and/or a secondary memory. Primary memory may include, for example, a random access memory, read only memory, etc. While illustrated in this example as being separate from processor(s) 902, it should be understood that all or part of a primary memory may be provided within or otherwise co-located/coupled with processor(s) 902. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to a computer-readable medium.

As such, in certain example implementations, the methods and/or apparatuses presented herein may take the form in whole or part of a computer-readable medium (which may form part of memory 904) that may include computer implementable instructions stored thereon, which if executed by processor(s) 902 may be operatively enabled to perform all or portions of the example operations as described herein.

Figure 10:
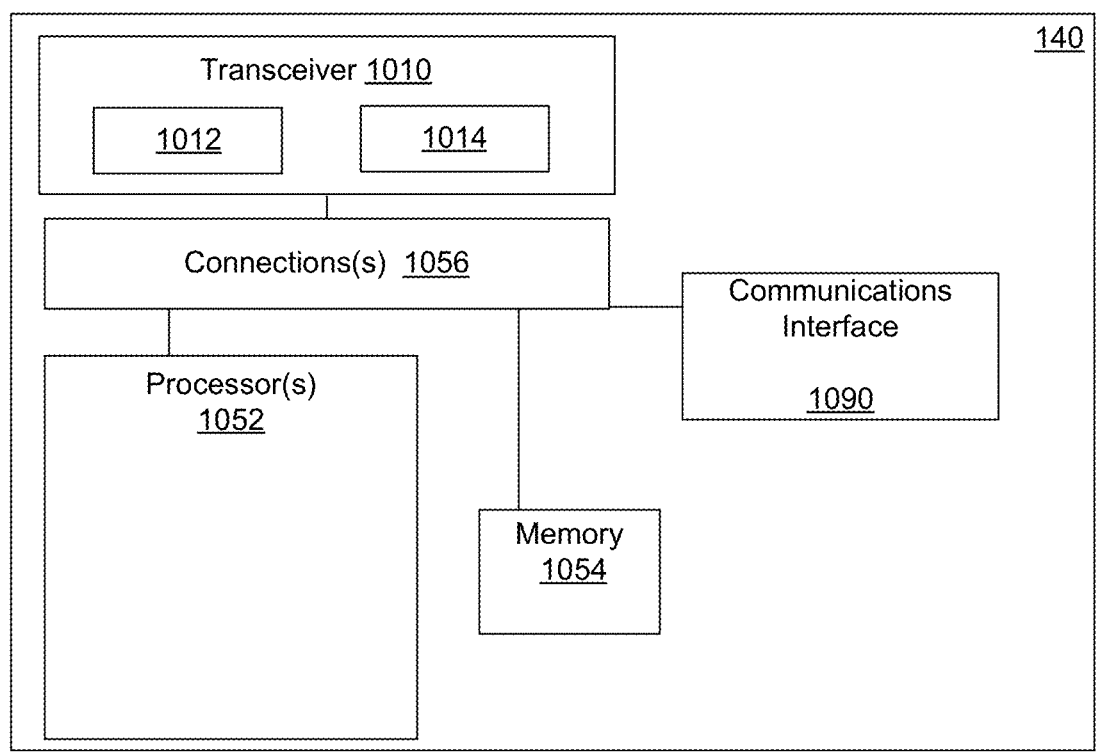
FIG. 10 is a schematic block diagram illustrating certain exemplary features of a base station/eNB.

FIG. 10 is a schematic block diagram illustrating base station/eNB 140. In some embodiments, base station/eNB 140 and/or processor(s) 1052 may perform, or be configured to perform, the base station/eNB portion of message flows 400 and/or 450, and methods 500 and/or 700. Further, base station/eNB 140 may be enabled to process requests for gap configuration, determine an appropriate gap configuration, generate gap configuration responses, etc.

In some embodiments, base station/eNB 140 may include, for example, one or more processor(s) 1052, memory 1054, and (as applicable) communications interface 1090 (e.g. wireline or wireless network interface), which may be operatively coupled with one or more connections 1056 (e.g., buses, lines, fibers, links, etc.). In certain example implementations, some portion of base station/eNB 140 may take the form of a chipset, and/or the like.

Communications interface 1090 may include a variety of wired and wireless connections that support wired transmission and/or reception and, if desired, may additionally or alternatively support transmission and reception of one or more signals over one or more types of wireless communication networks. Communications interface 1090 may also include interfaces for communication with various other computers and peripherals. For example, in one embodiment, communications interface 1090 may comprise network interface cards, input-output cards, chips and/or ASICs that implement one or more of the communication functions performed by eNB 140. In some embodiments, communications interface 1090 may also interface with network 130 (FIG. 1A) to obtain a variety of network configuration related information.

Processor(s) 1052 may be implemented using a combination of hardware, firmware, and software. In some embodiments, processor(s) 1052 may process requests for gap configuration, determine an appropriate gap configuration, generate gap configuration responses, etc.

The methodologies described herein in flow charts and message flows may be implemented by various means depending upon the application. For example, these methodologies may be implemented in hardware, firmware, software, or any combination thereof. For a hardware implementation, the processor(s) 1052 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using procedures, functions, etc. that perform the functions described herein. In some embodiments, for a software and/or firmware implementation, program code to perform functions associated with eNB 140 as described herein may be stored in memory 1054. The program code may be read and executed by processor(s) 1052. In some embodiments, memory 1054 may comprise machine-readable media. Any machine-readable medium tangibly embodying instructions may be used in implementing the methodologies described herein. For example, software may be stored in removable media, which may form part of memory 1054. Program code resident in memory 1054 (e.g. on computer readable media) and may be read and executed by processor(s) 1052. Memory may be implemented within processor(s) 1052 or external to processor(s) 1052. As used herein, the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium, which may form part of memory 1054. For example, memory 1054 may comprise program code, which when read and executed by processor(s) 1052, may process requests received by BS 140 for gap configuration, determine an appropriate gap configuration, generate gap configuration responses, etc.

Computer-readable media, which may form part of memory 1054, may include a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

Memory 1054 may represent any data storage mechanism. Memory 1054 may include, for example, a primary memory and/or a secondary memory. Primary memory may include, for example, a random access memory, read only memory, nonvolatile RAM, etc. While illustrated in this example as being separate from processor(s) 1052, it should be understood that all or part of a primary memory may be provided within or otherwise co-located/coupled with processor(s) 1052. Secondary memory may include, for example, the same or similar type of memory as primary memory and/or one or more data storage devices including, for example, hard disk drives, optical disc drives, tape drives, a solid state memory drive, etc. In some embodiments, memory 1054 may comprise one or more databases that may hold information pertaining to various entities in system 100 and/or the broader cellular network. In some embodiments, information in the databases may be read, used, and/or updated by processor(s) 1052 during various computations, including determining an appropriate gap configuration, processing UE requests, etc. In certain implementations, secondary memory may be operatively receptive of, or otherwise configurable to couple to computer-readable medium.

As such, in certain example implementations, the methods and/or apparatuses presented herein may take the form in whole or part of a computer-readable medium (which may form part of memory 1054) that may include computer implementable instructions stored thereon, which if executed by processor(s) 1052 may be operatively enabled to perform all or portions of the example operations as described herein.

Figure 11:
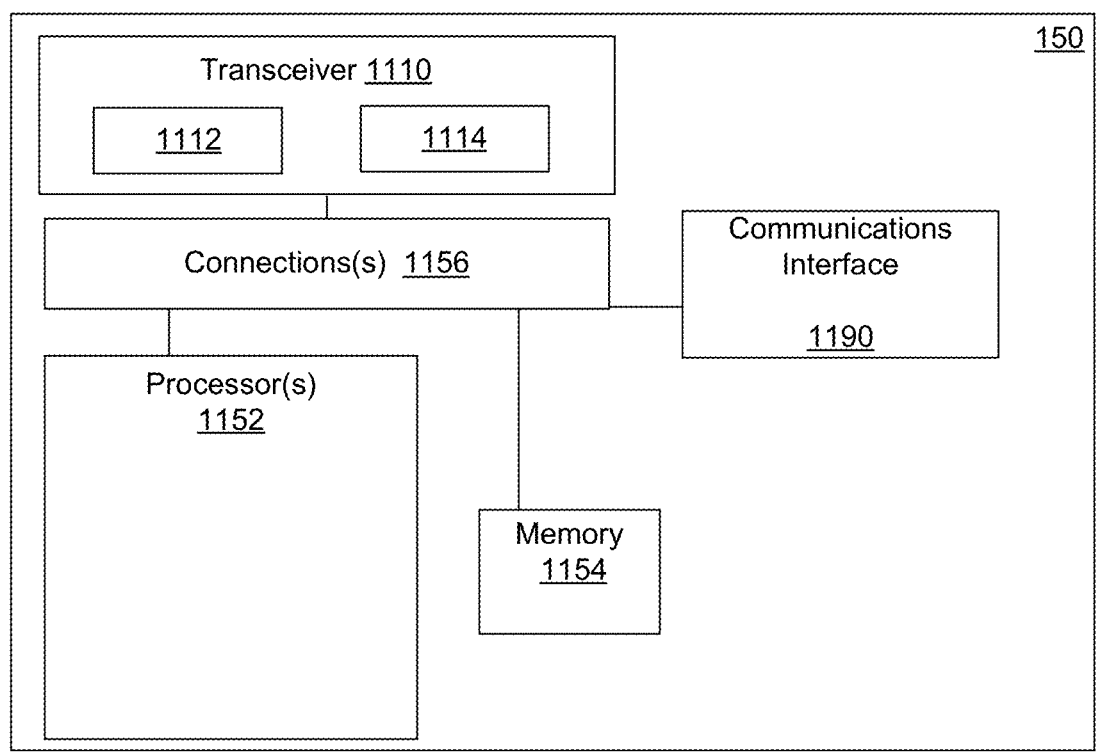
FIG. 11 is a schematic block diagram illustrating certain exemplary features of a location server.

FIG. 11 is a schematic block diagram illustrating LS 150, which, in some embodiments, may take the form of E-SMLC 155. In some embodiments, LS 150 and/or E-SMLC 155 and/or processor(s) 1152 may perform, or be configured to perform, the LS portion of message flows 400 and/or 450.

In some embodiments, LS 150 and/or E-SMLC 155 may include, for example, one or more processor(s) 1152, memory 1154, and (as applicable) communications interface 1190 (e.g. wireline or wireless network interface), which may be operatively coupled with one or more connections 1156 (e.g., buses, lines, fibers, links, etc.). In certain example implementations, some portion of LS 150 and/or E-SMLC 155 may take the form of a chipset, and/or the like.

Communications interface 1190 may include a variety of wired and wireless connections that support wired transmission and/or reception and, if desired, may additionally or alternatively support transmission and reception of one or more signals over one or more types of wireless communication networks. Communications interface 1190 may also include interfaces for communication with various other computers and peripherals. For example, in one embodiment, communications interface 1190 may comprise network interface cards, input-output cards, chips and/or ASICs that implement one or more of the communication functions performed by LS 150 and/or E-SMLC 155. In some embodiments, communications interface 1190 may also interface with network 130 (FIG. 1A) to obtain a variety of network configuration related information.

Processor(s) 1152 may be implemented using a combination of hardware, firmware, and software. In some embodiments, processor(s) 1152 on LS 150/E-SMLC 155 may process requests related to location determination, determine UE capabilities, interface with other network entities to facilitate UE location determination, and/or to provide UE location information.

The methodologies described herein in flow charts and message flows may be implemented by various means depending upon the application. For example, these methodologies may be implemented in hardware, firmware, software, or any combination thereof. For a hardware implementation, the processor(s) 1152 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using procedures, functions, etc. that perform the functions described herein. In some embodiments, for a software and/or firmware implementation, program code to perform functions associated with LS 150 and/or E-SMLC 155 as described herein may be stored in memory 1154. The program code may be read and executed by processor(s) 1152. In some embodiments, memory 1154 may comprise machine-readable media. Any machine-readable medium tangibly embodying instructions may be used in implementing the methodologies described herein. For example, software may be stored in removable media, which may form part of memory 1154. Program code resident in memory 1154 (e.g. on computer readable media) and may be read and executed by processor(s) 1152. Memory may be implemented within processor(s) 1152 or external to processor(s) 1152. As used herein, the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium, which may form part of memory 1154. For example, memory 1154 may comprise program code, which when read and executed by processor(s) 1152, may process requests received by LS 150 and/or E-SMLC 155 related to location determination, assistance data, etc.

Computer-readable media, which may form part of memory 1154, may include a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

Memory 1154 may represent any data storage mechanism. Memory 1154 may include, for example, a primary memory and/or a secondary memory. Primary memory may include, for example, a random access memory, read only memory, nonvolatile RAM, etc. While illustrated in this example as being separate from processor(s) 1152, it should be understood that all or part of a primary memory may be provided within or otherwise co-located/coupled with processor(s) 1152. Secondary memory may include, for example, the same or similar type of memory as primary memory and/or one or more data storage devices including, for example, hard disk drives, optical disc drives, tape drives, a solid state memory drive, etc. In some embodiments, memory 1154 may comprise one or more databases that may hold information pertaining to various entities in system 100 and/or the broader cellular network. In some embodiments, information in the databases may be read, used, and/or updated by processor(s) 1152 during various computations. In certain implementations, secondary memory may be operatively receptive of, or otherwise configurable to couple to a computer-readable medium.

As such, in certain example implementations, the methods and/or apparatuses presented herein may take the form in whole or part of a computer-readable medium (which may form part of memory 1154) that may include computer implementable instructions stored thereon, which if executed by processor(s) 1152 may be operatively enabled to perform all or portions of the example operations as described herein.

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A method on a UE comprising:
    receiving, at the UE, a Reference Signal Time Difference (RSTD) measurement request from an entity in a wireless network, wherein the UE is one of a Bandwidth reduced-Low complexity (BL) UE, or an enhanced Machine Type Communication (eMTC) UE or a Further enhanced MTC (FeMTC) UE, and wherein the RSTD measurement request involves only one or more intra frequency measurements by the UE;
    transmitting, by the UE to a Base Station (BS), in response to the RSTD measurement request, a dedicated gap request comprising a requested configuration of one or more dedicated gaps, wherein the requested configuration of the one or more dedicated gaps comprises a gap duration that is at least 14 ms or a gap periodicity that is greater than 80 ms, wherein the requested configuration of the one or more dedicated gaps is based, at least in part, on a current operational mode of the UE, wherein the current operational mode of the UE is a Coverage Enhanced (CE) Mode in which a number of repetitions of messages is increased with respect to the number of repetitions used in a non-CE mode to facilitate increased coverage;
    receiving, at the UE, in response to the dedicated gap request, a message comprising a dedicated RSTD measurement gap configuration; and
    measuring a plurality of positioning reference signals (PRS) during a dedicated RSTD measurement gap.

2. The method of claim 1, wherein the dedicated gap request comprises a request for dedicated measurement gaps and the message comprises a dedicated RSTD measurement gap configuration.

3. The method of claim 2, wherein the RSTD measurement request comprises positioning reference signal (PRS) assistance information, and the dedicated gap request comprising the request for dedicated measurement gaps is further transmitted in response to at least one of:
    a determination based, in part, on the PRS assistance information, that the RSTD measurement request involves a plurality of carrier frequencies, or
    a determination based, in part, on the PRS assistance information, that an estimated time to perform at least one RSTD measurement specified in the RSTD measurement request exceeds a default Long Term Evolution (LTE) measurement gap duration, or
    a determination based, in part, on the PRS assistance information, that a default LTE measurement gap periodicity exceeds at least one PRS periodicity ($T_{PRS}$) associated with the RSTD measurement request, or
    a determination based, in part, on the PRS assistance information, that a number of subframes ($N_{PRS}$) in at least one PRS positioning occasion related to the RSTD measurement request exceeds a threshold.

4. The method of claim 1, wherein the dedicated gap request comprises a request for dedicated autonomous gaps and the message comprises a dedicated autonomous RSTD measurement gap configuration.

5. The method of claim 4, wherein the RSTD measurement request comprises positioning reference signal (PRS) assistance information, and the dedicated gap request comprising the request for dedicated autonomous gaps is further transmitted in response to at least one of:
    a determination based, in part, on the PRS assistance information, that the RSTD measurement request involves a plurality of carrier frequencies, or
    a determination based, in part, on the PRS assistance information, that an estimated time to perform at least one RSTD measurement specified in the RSTD measurement request exceeds a default Long Term Evolution (LTE) autonomous gap duration, or
    a determination based, in part, on the PRS assistance information, that a default LTE autonomous gap periodicity exceeds at least one PRS periodicity ($T_{PRS}$) associated with the RSTD measurement request, or
    a determination based, in part, on the PRS assistance information, that a number of subframes ($N_{PRS}$) in at least one PRS positioning occasion associated with the RSTD measurement request exceeds a threshold.

6. The method of claim 1, wherein the requested configuration of the one or more dedicated gaps is further based, at least in part, on one or more of:
    a positioning reference signal (PRS) periodicity ($T_{PRS}$) associated with at least one base station (BS) related to the RSTD measurement request; or
    a number of subframes ($N_{PRS}$) in a PRS positioning occasion associated with the at least one BS; or
    a desired accuracy for a position of the UE, wherein the position of the UE is to be determined based on a plurality of RSTD measurements performed by the UE in response to the RSTD measurement request; or
    a combination thereof.

7. The method of claim 6, wherein at least one of: the PRS periodicity ($T_{PRS}$) associated with the at least one BS, or the number of subframes ($N_{PRS}$) in the PRS positioning occasion associated with the at least one BS, are provided as PRS assistance information.

8. The method of claim 1, wherein the requested configuration of the one or more dedicated gaps comprises at least one of:
- a requested dedicated gap duration; or
- a requested dedicated gap periodicity; or
- a requested number of dedicated gap instances; or
- a combination thereof.

9. The method of claim 8, wherein the requested dedicated gap duration and the requested dedicated gap periodicity differ from a default Long Term Evolution (LTE) measurement gap duration and a default LTE measurement gap periodicity, respectively.

10. The method of claim 1, wherein the dedicated RSTD measurement gap configuration comprises at least one of:
- a configured dedicated gap duration; or
- a configured dedicated gap periodicity; or
- a configured number of dedicated gap instances; or
- a combination thereof.

11. The method of claim 10, wherein the configured dedicated gap duration and the configured dedicated gap periodicity differ from a default Long Term Evolution (LTE) measurement gap duration and a default LTE measurement gap periodicity, respectively.

12. A User Equipment (UE) comprising:
a transceiver, and
a processor coupled to the transceiver, wherein the processor is configured to:
receive at the UE, a Reference Signal Time Difference (RSTD) measurement request from an entity in a wireless network, wherein the UE is one of a Bandwidth reduced-Low complexity (BL) UE, or an enhanced Machine Type Communication (eMTC) UE or a Further enhanced MTC (FeMTC) UE, and wherein the RSTD measurement request involves only one or more intra frequency measurements by the UE;
transmit, from the UE to a first Base Station (BS), in response to the RSTD measurement request, a dedicated gap request comprising a requested configuration of one or more dedicated gaps, wherein the requested configuration of the one or more dedicated gaps comprises a gap duration that is at least 14 ms or a gap periodicity that is greater than 80 ms, wherein the requested configuration of the one or more dedicated gaps is based, at least in part, on a current operational mode of the UE, wherein the current operational mode of the UE is a Coverage Enhanced (CE) Mode in which a number of repetitions of messages is increased with respect to the number of repetitions used in a non-CE mode to facilitate increased coverage;
receive, at the UE, in response to the dedicated gap request, a message comprising a dedicated RSTD measurement gap configuration; and
measure a plurality of positioning reference signals (PRS) during a dedicated RSTD measurement gap.

13. The UE of claim 12, wherein the dedicated gap request comprises a request for dedicated measurement gaps and the message comprises a dedicated RSTD measurement gap configuration.

14. The UE of claim 13, wherein the RSTD measurement request comprises positioning reference signal (PRS) assistance information, and the dedicated gap request comprising the request for dedicated measurement gaps is further transmitted in response to at least one of:
- a determination based, in part, on the PRS assistance information, that the RSTD measurement request involves a plurality of carrier frequencies, or
- a determination based, in part, on the PRS assistance information, that an estimated time to perform at least one RSTD measurement specified in the RSTD measurement request exceeds a default Long Term Evolution (LTE) measurement gap duration, or
- a determination based, in part, on the PRS assistance information, that a default LTE measurement gap periodicity exceeds at least one PRS periodicity ($T_{PRS}$) associated with the RSTD measurement request, or
- a determination based, in part, on the PRS assistance information, that a number of subframes ($N_{PRS}$) in at least one PRS positioning occasion related to the RSTD measurement request exceeds a threshold.

15. The UE of claim 12, wherein the dedicated gap request comprises a request for dedicated autonomous gaps and the message comprises a dedicated autonomous RSTD measurement gap configuration.

16. The UE of claim 15, wherein the RSTD measurement request comprises positioning reference signal (PRS) assistance information, and the dedicated gap request comprising the request for dedicated autonomous gaps is further transmitted in response to at least one of:
- a determination based, in part, on the PRS assistance information, that the RSTD measurement request involves a plurality of carrier frequencies, or
- a determination based, in part, on the PRS assistance information, that an estimated time to perform at least one RSTD measurement specified in the RSTD measurement request exceeds a default Long Term Evolution (LTE) autonomous gap duration, or
- a determination based, in part, on the PRS assistance information, that a default LTE autonomous gap periodicity exceeds at least one PRS periodicity ($T_{PRS}$) associated with the RSTD measurement request, or
- a determination based, in part, on the PRS assistance information, that a number of subframes ($N_{PRS}$) in at least one PRS positioning occasion related to the RSTD measurement request exceeds a threshold.

17. The UE of claim 12, wherein the requested configuration of the one or more dedicated gaps is further based, at least in part, on one or more of:
- a positioning reference signal (PRS) periodicity ($T_{PRS}$) associated with at least one base station (BS) related to the RSTD measurement request; or
- a number of subframes ($N_{PRS}$) in a PRS positioning occasion associated with the at least one BS; or
- a desired accuracy for a position of the UE, wherein the position of the UE is to be determined based on a plurality of RSTD measurements performed by the UE in response to the RSTD measurement request; or
- a combination thereof.

18. The UE of claim 12, wherein the requested configuration of the one or more dedicated gaps comprises at least one of:
- a requested dedicated gap duration; or
- a requested dedicated gap periodicity; or
- a requested number of dedicated gap instances; or
- a combination thereof.

19. The UE of claim 12, wherein the dedicated RSTD measurement gap configuration comprises at least one of:
- a configured dedicated gap duration; or
- a configured dedicated gap periodicity; or
- a configured number of dedicated gap instances; or
- a combination thereof.

20. The UE of claim 19, wherein the configured dedicated gap duration and the configured dedicated gap periodicity differ from a default Long Term Evolution (LTE) measurement gap duration and a default LTE measurement gap periodicity, respectively.

21. A User Equipment (UE) comprising:
- means for receiving, at the UE, a Reference Signal Time Difference (RSTD) measurement request from an entity in a wireless network, wherein the UE is one of a Bandwidth reduced-Low complexity (BL) UE, or an enhanced Machine Type Communication (eMTC) UE or a Further enhanced MTC (FeMTC) UE, and wherein the RSTD measurement request involves only one or more intra frequency measurements by the UE;
- means for transmitting, from the UE to a Base Station (BS), in response to the RSTD measurement request, a dedicated gap request comprising a requested configuration of one or more dedicated gaps, wherein the requested configuration of the one or more dedicated gaps comprises a gap duration that is at least 14 ms or a gap periodicity that is greater than 80 ms, wherein the requested configuration of the one or more dedicated gaps is based, at least in part, on a current operational mode of the UE, wherein the current operational mode of the UE is a Coverage Enhanced (CE) Mode in which a number of repetitions of messages is increased with respect to the number of repetitions used in a non-CE mode to facilitate increased coverage;
- means for receiving, at the UE, in response to the dedicated gap request, a message comprising a dedicated RSTD measurement gap configuration; and
- means for measuring a plurality of positioning reference signals (PRS) during a dedicated RSTD gap.

22. The UE of claim 21, wherein the dedicated gap request comprises a request for dedicated measurement gaps and the message comprises a dedicated RSTD measurement gap configuration.

23. The UE of claim 21, wherein the dedicated gap request comprises a request for dedicated autonomous gaps and the message comprises a dedicated autonomous RSTD measurement gap configuration.

24. A non-transitory computer-readable medium comprising executable instructions to configure a processor on a User Equipment (UE) to:
- receive, at the UE, a Reference Signal Time Difference (RSTD) measurement request from an entity in a wireless network, wherein the UE is one of a Bandwidth reduced-Low complexity (BL) UE, or an enhanced Machine Type Communication (eMTC) UE or a Further enhanced MTC (FeMTC) UE, and wherein the RSTD measurement request involves only one or more intra frequency measurements by the UE;
- transmit, from the UE to a Base Station (BS), in response to the RSTD measurement request, a dedicated gap request comprising a requested configuration of one or more dedicated gaps, wherein the requested configuration of the one or more dedicated gaps comprises at least one of gap duration that is at least 14 ms or a gap periodicity that is greater than 80 ms, wherein the requested configuration of the one or more dedicated gaps is based, at least in part, on a current operational mode of the UE, wherein the current operational mode of the UE is a Coverage Enhanced (CE) Mode in which a number of repetitions of messages is increased with respect to the number of repetitions used in a non-CE mode to facilitate increased coverage;
- receive, at the UE, in response to the dedicated gap request, a message comprising a dedicated RSTD measurement gap configuration; and
- measure a plurality of positioning reference signals (PRS) during a dedicated RSTD gap.

25. The computer-readable medium of claim 24, wherein the dedicated gap request comprises a request for dedicated measurement gaps and the message comprises a dedicated RSTD measurement gap configuration.

26. The computer-readable medium of claim 24, wherein the dedicated gap request comprises a request for dedicated autonomous gaps and the message comprises a dedicated autonomous RSTD measurement gap configuration.

27. The method of claim 1, wherein data loss by the UE during dedicated gaps is limited by using a lower rate of transmissions of data than used outside the dedicated gaps by the Base Station during the dedicated gaps.

28. The UE of claim 12, wherein data loss by the UE during dedicated gaps is limited by using a lower rate of transmissions of data than used outside the dedicated gaps by the Base Station during the dedicated gaps.

* * * * *